US012610398B2

(12) United States Patent
Pettersson et al.

(10) Patent No.: US 12,610,398 B2
(45) Date of Patent: Apr. 21, 2026

(54) CHANNEL ACCESS COORDINATION FOR TXOP SHARING

(71) Applicant: Telefonaktiebolaget LM Ericsson (publ), Stockholm (SE)

(72) Inventors: Charlie Pettersson, Solna (SE); Dennis Sundman, Sollentuna (SE); Miguel Lopez, Aachen (DE); Rocco Di Taranto, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 421 days.

(21) Appl. No.: 18/036,939

(22) PCT Filed: Nov. 17, 2020

(86) PCT No.: PCT/EP2020/082373
§ 371 (c)(1),
(2) Date: May 15, 2023

(87) PCT Pub. No.: WO2022/105983
PCT Pub. Date: May 27, 2022

(65) Prior Publication Data
US 2024/0008080 A1     Jan. 4, 2024

(51) Int. Cl.
*H04W 74/0816*     (2024.01)
*H04W 72/02*     (2009.01)
*H04W 74/08*     (2024.01)

(52) U.S. Cl.
CPC ....... *H04W 74/0816* (2013.01); *H04W 72/02* (2013.01); *H04W 74/0866* (2013.01)

(58) Field of Classification Search
CPC ... H04W 16/14; H04W 72/02; H04W 74/002; H04W 74/02; H04W 74/04; H04W 74/0816; H04W 74/0866
See application file for complete search history.

(56) References Cited

U.S. PATENT DOCUMENTS

2020/0077273 A1 *  3/2020  Cherian ................ H04W 48/20
2021/0168712 A1 *  6/2021  Cherian ............ H04W 72/0446
(Continued)

FOREIGN PATENT DOCUMENTS

WO     2021071798 A1     4/2021
WO     2021113080 A1     6/2021

OTHER PUBLICATIONS 802.11 Working Group of The LAN, "IEEE P802.11ax™/D6.0", Draft Standard for Information technology—Telecommunications and information exchange between systems Local and metropolitan area networks—Specific requirements, Part 11: Wireless LAN Medium Access Control (MAC) and Physical Layer (PHY) Specifications, Nov. 2019, 1-780.
(Continued)

*Primary Examiner* — Kashif Siddiqui
(74) *Attorney, Agent, or Firm* — Murphy, Bilak & Homiller, PLLC

(57)     ABSTRACT

Channel access coordination for TXOP sharing An access point of a wireless communication system operates on a primary bandwidth part 5 (Ch2, Ch3) of a medium. This operation on the primary bandwidth part (Ch2, Ch3) is based on carrier sensing to gain access to the primary bandwidth part of the medium. Further, the access point scans a secondary bandwidth part (Ch1, Ch2) of the medium to detect control messages transmitted on the secondary bandwidth part (Ch1, Ch2), without performing carrier sensing to gain access to the secondary bandwidth part (Ch1, Ch2) of the medium. Further, the AP 10 detects a control message indicating that another AP reserved a transmission opportunity, TXOP, on the secondary bandwidth part (Ch1, Ch2) of the medium. In response to the control message, the AP cooperates with the other AP by sharing the TXOP for performing one or more transmissions of data. 15

20 Claims, 14 Drawing Sheets

(56) References Cited

U.S. PATENT DOCUMENTS

2021/0410163 A1 *  12/2021  Xia ..................... H04W 72/121
2023/0107240 A1 *   4/2023  Sundman ............ H04B 7/0452
                                               370/329

OTHER PUBLICATIONS

IEEE Computer Society, "IEEE Std 802.11-2016", IEEE Standard
for Information Technology—Telecommunications and information
exchange between systems, Local and Metropolitan Area Networks—
Specific Requirements, Part 11: Wireless LAN Medium Access
Control (MAC) and Physical Layer (PHY) Specifications, 2016,
1-3534.
Jason, Yuchen Gua, et al., "Coordinated Spatial Reuse Operation",
IEEE 802.11-20/0033r0, Dec. 31, 2014, 1-14.
Park, Minyoung, et al., "Enhanced Multi-Link Single Radio Opera-
tion", IEEE doc.: 802.11-20/0562r3, Jun. 1-22, 2020.
Sungjin Park, et al., "Coordinated Spatial Reuse Procedure", IEEE
802.11-20/0410r0, Mar. 1-20, 2020.
Verma, Lochan, et al., "Coordinated AP Time/Frequency Sharing in
a Transmit Opportunity in 11be", doc.: IEEE 802.11-19/1582r1,
Submission, Nov. 1-16, 2019.
Verma, Lochan, et al., "Coordinated AP Time/Frequency Sharing in
a Transmit Opportunity in 11be", Qualcomm, et al., doc.: IEEE
802.11-19/1582r0, Nov. 2019, 12 pages.

* cited by examiner

| TX Indication and Request | Schedule Allocation | Data TX |
|---|---|---|

← TXOP Duration →

FIG. 1A

| Data TX |
|---|

TXOP Owner AP1 | Trg | 80 MHz: Data | ACK |

AP2 | 80 MHz: Data | ACK |

AP3 | 80 MHz: Data | ACK |

AP4 | 80 MHz: Data | ACK |

FIG. 2A

| Data TX |
|---|

TXOP Owner AP1 | Trg | 20 MHz: Idle / 20 MHz: Idle / 20 MHz: Idle / 20 MHz: Data | ACK |

AP2 | 20 MHz: Idle / 20 MHz: Idle / 20 MHz: Data / 20 MHz: Idle | ACK |

AP3 | 20 MHz: Idle / 20 MHz: Data / 20 MHz: Idle / 20 MHz: Idle | ACK |

AP4 | 20 MHz: Data / 20 MHz: Idle / 20 MHz: Idle / 20 MHz: Idle | ACK |

FIG. 2B

1110 — Initial setup of channel access coordination

1120 — Operate on primary bandwidth part

1130 — Scan secondary bandwidth part

1140 — Detect control message indicating reservation of TXOP in the secondary bandwidth part 1150 — Cooperate with other AP(s) by sharing the TXOP for transmission(s) of data 1210 — Module 1:
Initial setup of
channel access coordination 1220 — Module 2:
Operating on
primary bandwidth part 1230 — Module 3:
Scanning secondary bandwidth part 1240 — Module 4:
Detecting control message indicating
reservation of TXOP in
the secondary bandwidth part 1250 — Module 5:
Cooperating with other AP(s)
by sharing the TXOP for
transmission(s) of data

1200

ACCESS POINT

1310 — Initial setup of channel access coordination

1320 — Operate on bandwidth part

1330 — Reserve TXOP

1340 — Send control message initiating sharing of the TXOP with AP(s) operating on other bandwidth part(s)

1350 — Cooperate with other AP(s) by sharing the TXOP for transmission(s) of data 1410 — Module 1:
Initial setup of
channel access coordination 1420 — Module 2:
Operating on bandwidth part 1430 — Module 3:
Reserving TXOP 1440 — Module 4:
Sending control message initiating
sharing of the TXOP with AP(s)
operating on other bandwidth part(s)

1450 — Module 5:
Cooperating with other AP(s)
by sharing the TXOP for
transmission(s) of data

1400

ACCESS POINT

CHANNEL ACCESS COORDINATION FOR TXOP SHARING

TECHNICAL FIELD

The present invention relates to methods for controlling wireless transmissions and to corresponding devices, systems, and computer programs.

BACKGROUND

In wireless communication technologies, there is an increased interest in using unlicensed bands, like the 2.4 GHz ISM band, the 5 GHz band, the 6 GHz band, and the 60 GHz band using more advanced channel access technologies. Historically, Wi-Fi has been the dominant standard in unlicensed bands when it comes to applications requiring support for high data rates. Due to the large available bandwidth in the unlicensed band, the WLAN (Wireless Local Area Network) technology based on the IEEE 802.11 family standards provides a very simple distributed channel access mechanism based on the so-called distributed coordination function (DCF).

Distributed channel access means that a device, in IEEE 802.11 terminology known as a station (STA), tries to access the channel when it has data to send. Effectively there is no difference in channel access whether the station is an access point (AP) or a non-access point (non-AP). DCF works well as long as the load is not too high. When the load is high, and in particular when the number of stations trying to access the channel is large, channel access based on DCF does not work well. The reason for this is that there will be a high probability of collision on the channel, leading to poor channel usage.

To improve the channel usage, and in particular to allow for better support of a large number of devices, a more centralized channel access may be utilized. Such centralized channel access may involve that rather than letting a STA access the channel whenever it has data to send, the channel access is controlled by the AP. A corresponding channel access scheme is for example supported in the IEEE 802.11ax technology, see IEEE P802.11ax™/D6.0 Draft Standard for Information technology—Tele-communications and information exchange between systems Local and metropolitan area networks-Specific requirements Part 11: Wireless LAN Medium Access Control (MAC) and Physical Layer (PHY) Specifications Amendment 1: Enhancements for High Efficiency WLAN (November 2019), in the following denoted as "IEEE 802.11ax Draft". The IEEE 802.11ax technology for example supports orthogonal frequency division multiple access (OFDMA) in both downlink (DL), i.e., in a direction from the AP to the STA, and uplink (UL), i.e., in a direction from the STA to the AP. Also multi-user transmission in form of multi-user multiple input multiple output (MU-MIMO) is supported for both the DL and the UL. By supporting MU transmission and letting the AP control the channel access within a cell, efficient channel usage is achieved and one can avoid collisions due to contention in the cell, in the IEEE 802.11 terminology also referred to as basic service set (BSS).

A default channel access mechanism used in current WLAN systems is referred to as enhanced distributed channel access (EDCA), as specified in IEEE Standard for Information technology-Telecommunications and information exchange between systems Local and metropolitan area networks-Specific requirements—Part 11: Wireless LAN Medium Access Control (MAC) and Physical Layer (PHY)

Specifications," in IEEE Std 802.11-2016 (Revision of IEEE Std 802.11-2012), vol., no., pp. 1-3534, 14 Dec. 2016, in the following denoted as "IEEE 802.11 Specifications". In the EDCA channel access mechanism, the STA accesses the channel using a set of channel access parameters based on a traffic class of the data. The channel is obtained for a TXOP duration time, in which multiple frames of the same data class may be transmitted. The maximum size of a TXOP depends on the data type. A typical duration of a TXOP is in the range of a few milliseconds.

To improve the performance even further, coordination of channel usage between cells may be utilized. Here, one approach is to let a number of APs share a TXOP. For example, if there are two or more APs within range using the same channel, with no coordination each of them would contend for the channel and the AP that wins the contention would then reserve the channel using the TXOP concept. The other APs would have to defer from channel access and wait for the TXOP to end. Then a new contention begins and channel access may or may not be gained for a specific AP. This implies that channel access becomes rather unpredictable and support for demanding QoS (Quality of Service) applications may be challenging. Such issues may be avoided by coordinated sharing of the TXOP by multiple APs. Such features are also referred to as coordinated or cooperating APs (CAP).

For example, "Coordinated AP Time/Frequency Sharing in a Transmit Opportunity in 11be", Internet document IEEE 802.11-19/1582r1 (URL: "https://mentor.ieee.org/802.11/dcn/19/11-19-1582-01-00be-coordinated-ap-time-and-frequency-sharing-in-a-transmit-opportunity-in-11be.pptx", November 2019) proposes a time/frequency resource sharing mechanism for an enhancement of the WLAN technology referred to as EHT (Extremely High Throughput). In this mechanism multiple APs belonging to the same Extended Service Set (ESS) can coordinate and share among themselves their time/frequency resources within a TXOP. The proposed mechanism consists of the three phases, as schematically illustrated in FIG. 1A. The first phase involves transmission of a TX indication frame and a request frame. In the first phase an AP that has gained a TXOP, also denoted as the TXOP owner, indicates to other APs that it is willing to share the TXOP (by means of the TX indication frame), and one or more neighboring APs indicate their intention to participate in sharing the resources (by the request frame). The TXOP owner may also be referred to as "Sharing AP", and the participating AP(s) may also be referred to as "Shared AP(s)". The first phase may also be referred to as initial coordination phase. In the second phase the TXOP owner informs the participating APs about their allocated resources and a TX start time, and the participating APs inform their client STAs about their respective resource allocations. In the third phase the participating APs transmit on their respective allocated resources in the TXOP, beginning at the TX start time.

Figure 1A:
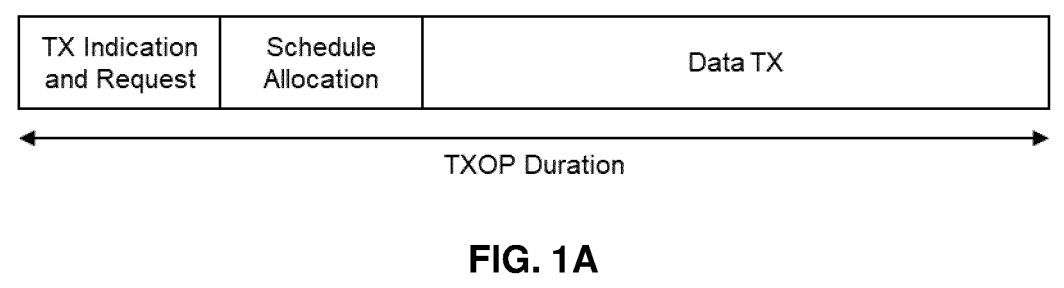

FIG. 1B illustrates further details of the first phase, assuming a scenario with four APs, denoted as AP1, AP2, AP3, and AP4. In the example of FIG. 1B, the TXOP owner, i.e., AP1 first sends a CTI (CAP TXOP Indication) message, and the APs willing to participate in the sharing of the TXOP, i.e., AP2, AP3, and AP4, respond with a CTR (CAP TXOP Request) message. By means of the CTI message, AP1 notifies the other APs that it has obtained the TXOP and is willing to share it. By means of the CTR, AP2, AP3, and AP4 notify AP1 that they are willing to participate in the sharing of the TXOP.

FIG. 1C illustrates further details of the second phase, again assuming a scenario with four APs, denoted as AP1, AP2, AP3, and AP4. In the example of FIG. 1C, the TXOP owner, i.e., AP1, informs the participating APs, i.e., AP2, AP3, AP3, about their allocated resources and the TX start time. This is accomplished by sending a CTAS (CAP TXOP AP Schedule) message and the participating APs inform their associated STAs about their respectively allocated resources according to local scheduling within the BSS of the participating AP. This is accomplished by sending a CTLS (CAP TXOP Local Schedule) message.

The sharing of the TXOP during the transmission of data in the third phase can be based on multiplexing in the time domain, e.g., TDMA (Time Division Multiple Access), multiplexing in the frequency domain, e.g., OFDMA, or multiplexing in the spatial domain, e.g., using MU-MIMO (Multi-User Multiple Input/Multiple Output). FIG. 2A illustrates an example of sharing based on multiplexing in the time domain, and FIG. 2B shows an example of sharing in the frequency domain.

Further, the sharing of the TXOP can be based on spatial reuse, which is also referred to as coordinated spatial reuse (CSR). In such variants, the resources of the TXOP can be used simultaneously, sometimes in combination with transmit power control, and multiplexing of the resources of the TXOP is not required. CSR-based operation is for example described in "Coordinated Spatial Reuse Operation", Internet document IEEE 802.11-20/0033r0 (URL: https://mentor.ieee.org/802.11/dcn/20/11-20-0033-00-00be-coordinated-spatial-reuse-operation.pptx, December 2019) or in "Coordinated Spatial Reuse Procedure", Internet document IEEE 802.11-20/0410r0 (URL: https://mentor.ieee.org/802.11/dcn/20/11-20-0410-00-00be-coordinated-spatial-reuse-procedure.pptx, March 2020).

Further enhancements involve multi-link operation of non-AP STAs, e.g., as for example discussed in "Enhanced multi-link single radio operation", Internet document IEEE 802.11-20/0562r3 (URL: https://mentor.ieee.org/802.11/dcn/20/11-20-0562-03-00be-enhanced-multi-link-single-radio-operation.pptx, June 2020). In such cases, a non-AP STA can simultaneously listen to transmissions on two links, which utilize different frequency channels, different bandwidth parts, or even different bands. Such parallel links may also be referred to as primary link and secondary link, or as primary bandwidth part and secondary bandwidth part A control frame transmitted by an AP on one of the links indicates to the non-AP STA which link will be used for an upcoming data transmission. Upon reception of the control frame, non-AP MLD responds with a control frame, e.g., a CTS. The data transmission then follows the response from the non-AP STA. As a result, the non-AP STA and the AP exchange frames on one link at a time. Such operation is also referred to as MLSR (Multi Link Single Radio).

However, it is not straightforward to combine multi-link operation with coordinated TXOP sharing. For example, if two APs have an overlapping primary bandwidth part but non-overlapping secondary bandwidth parts, the existing TXOP sharing mechanisms would not allow for efficiently utilizing the non-overlapping secondary bandwidth parts. This can be attributed to the AP not being able to use a channel before it has monitored the occupation status of this channel, which is also referred to as synchronization to the channel, with the synchronization process duration being in the order of a TXOP duration. In addition, if the AP starts the synchronization process on a new channel it typically loses synchronization to the previously used channel. This may adversely affect performance due to delays arising from frequent multiple synchronization processes.

Accordingly, there is a need for techniques which allow for improved utilization of TXOP sharing in situations where a wireless device can utilize multiple bandwidth parts of a medium requiring carrier sensing to gain access to the bandwidth part.

SUMMARY

According to an embodiment, a method of controlling wireless transmissions in a wireless communication system is provided. According to the method, an access point (AP) of the wireless communication system operates on a primary bandwidth part of a medium. This operation on the primary bandwidth part is based on carrier sensing to gain access to the primary bandwidth part of the medium. Further, the AP scans a secondary bandwidth part of the medium to detect control messages transmitted on the secondary bandwidth part, without performing carrier sensing to gain access to the secondary bandwidth part of the medium. Further, the AP detects a control message indicating that another AP reserved a transmission opportunity (TXOP) on the secondary bandwidth part of the medium. In response to the control message, the AP cooperates with the other AP by sharing the TXOP for performing one or more transmissions of data.

According to a further embodiment, a method of controlling wireless transmissions in a wireless communication system is provided. According to the method, an AP of the wireless communication system operates on a bandwidth part of a medium. This operation on the bandwidth is based on carrier sensing to gain access to the bandwidth part of the medium. In response to gaining access to the bandwidth part of the medium, the access point reserves a TXOP on the bandwidth part. Further, the AP sends a control message for initiating sharing of the TXOP with one or more other APs operating on another bandwidth part of the medium. In response to the control message, the AP cooperates with the one or more other APs by sharing the TXOP for performing one or more transmissions of data.

According to a further embodiment, an AP for a wireless communication system is provided. The AP is configured for operating on a primary bandwidth part of a medium, said operating on the primary bandwidth part being based on carrier sensing to gain access to the primary bandwidth part of the medium. Further, the AP is configured for scanning a secondary bandwidth part of the medium to detect control messages transmitted on the secondary bandwidth part, without performing carrier sensing to gain access to the secondary bandwidth part of the medium. Further, the AP is configured for detecting a control message indicating that another access point reserved a TXOP on the secondary bandwidth part of the medium. Further, the AP is configured for, in response to the control message, cooperating with the other access point by sharing the TXOP for performing one or more transmissions of data.

According to a further embodiment, an AP for a wireless communication system is provided. The AP comprises at least one processor and a memory. The memory contains instructions executable by said at least one processor, whereby the AP is operative to operate on a primary bandwidth part of a medium, the operation on the primary bandwidth part being based on carrier sensing to gain access to the primary bandwidth part of the medium. Further, the memory contains instructions executable by said at least one processor, whereby the AP is operative to scan a secondary bandwidth part of the medium to detect control messages transmitted on the secondary bandwidth part, without performing carrier sensing to gain access to the secondary bandwidth part of the medium. Further, the memory contains instructions executable by said at least one processor, whereby the AP is operative to detect a control message indicating that another access point reserved a TXOP on the secondary bandwidth part of the medium. Further, the memory contains instructions executable by said at least one processor, whereby the AP is operative to, in response to the control message, cooperate with the other access point by sharing the TXOP for performing one or more transmissions of data.

According to a further embodiment, an AP for a wireless communication system is provided. The AP is configured for operating on a bandwidth part of a medium, the operation on the bandwidth part being based on carrier sensing to gain access to the bandwidth part of the medium. Further, the AP is configured for, in response to gaining access to the bandwidth part of the medium, reserving a TXOP on the bandwidth part. Further, the AP is configured for sending a control message for initiating sharing of the TXOP with one or more other access points operating on another bandwidth part of the medium. Further, the AP is configured for, in response to the control message, cooperating with the one or more other access points by sharing the TXOP for performing one or more transmissions of data.

According to a further embodiment, an AP for a wireless communication system is provided. The AP comprises at least one processor and a memory. The memory contains instructions executable by said at least one processor, whereby the AP is operative to operate on a bandwidth part of a medium, the operation on the bandwidth part being based on carrier sensing to gain access to the bandwidth part of the medium. Further, the memory contains instructions executable by said at least one processor, whereby the AP is operative to, in response to gaining access to the bandwidth part of the medium, reserve a TXOP on the bandwidth part. Further, the memory contains instructions executable by said at least one processor, whereby the AP is operative to send a control message for initiating sharing of the TXOP with one or more other access points operating on another bandwidth part of the medium. Further, the memory contains instructions executable by said at least one processor, whereby the AP is operative to, in response to the control message, cooperate with the one or more other access points by sharing the TXOP for performing one or more transmissions of data.

According to a further embodiment of the invention, a computer program or computer program product is provided, e.g., in the form of a non-transitory storage medium, which comprises program code to be executed by at least one processor of an AP for a wireless communication system is provided. Execution of the program code causes the AP to operate on a primary bandwidth part of a medium, the operation on the primary bandwidth part being based on carrier sensing to gain access to the primary bandwidth part of the medium. Further, execution of the program code causes the AP to scan a secondary bandwidth part of the medium to detect control messages transmitted on the secondary bandwidth part, without performing carrier sensing to gain access to the secondary bandwidth part of the medium. Further, execution of the program code causes the AP to detect a control message indicating that another access point reserved a TXOP on the secondary bandwidth part of the medium. Further, execution of the program code causes the AP to, in response to the control message, cooperate with the other access point by sharing the TXOP for performing one or more transmissions of data.

According to a further embodiment of the invention, a computer program or computer program product is provided, e.g., in the form of a non-transitory storage medium, which comprises program code to be executed by at least one processor of an AP for a wireless communication system is provided. Execution of the program code causes the AP to operate on a bandwidth part of a medium, the operation on the bandwidth part being based on carrier sensing to gain access to the bandwidth part of the medium. Further, execution of the program code causes the AP to, in response to gaining access to the bandwidth part of the medium, reserve a TXOP on the bandwidth part. Further, execution of the program code causes the AP to send a control message for initiating sharing of the TXOP with one or more other access points operating on another bandwidth part of the medium. Further, execution of the program code causes the AP to, in response to the control message, cooperate with the one or more other access points by sharing the TXOP for performing one or more transmissions of data.

Details of such embodiments and further embodiments will be apparent from the following detailed description of embodiments.

BRIEF DESCRIPTION OF THE DRAWINGS

FIGS. 2A and 2B illustrate examples of resource utilization when sharing a TXOP.

DETAILED DESCRIPTION OF EMBODIMENTS

Figure 1B:
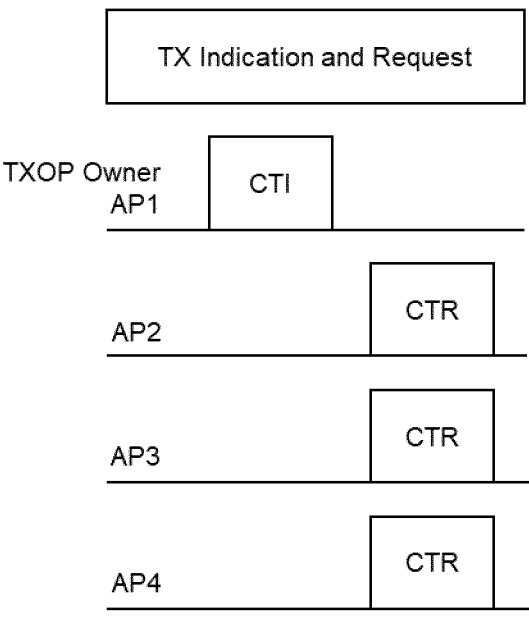
FIGS. 1A. 1B, and 1C schematically illustrate an example of a procedure for sharing of a TXOP by multiple APs.
Figure 1C:
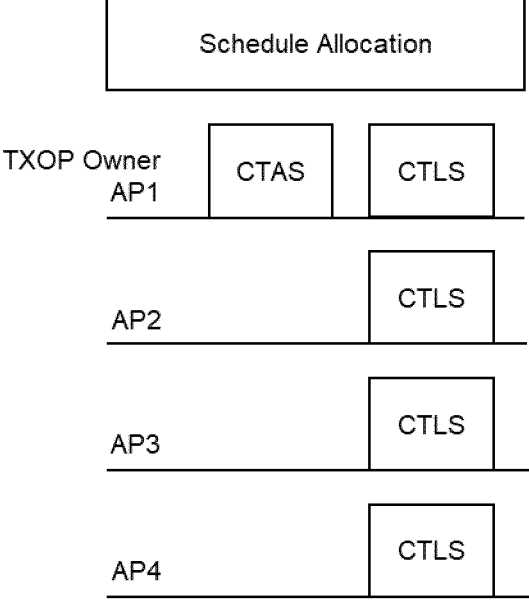

In the following, concepts in accordance with exemplary embodiments of the invention will be explained in more detail and with reference to the accompanying drawings. The illustrated embodiments relate to controlling of wireless transmissions in a wireless communication system. The wireless communication system may be a WLAN (Wireless Local Area Network) system based on a IEEE 802.11 technology. However, it is noted that the illustrated concepts could also be applied to other wireless communication technologies, e.g., to contention-based modes of the LTE (Long Term Evolution) or NR (New Radio) technology specified by 3GPP (3$^{rd}$ Generation Partnership Project).

The illustrated concepts involve initiating TXOP sharing by utilizing of a control message which can be detected by APs operating on different bandwidth parts. As a result, an AP operating on a first channel and gaining access to the channel in response to a successful (Clear Channel Assessment) procedure, e.g., according to the rules defined in the IEEE 802.11 Specifications, can reserve a TXOP and make the TXOP available for sharing also to APs which operate on other channels and thus do not perform CCA procedures on the first channel. The TXOP sharing can therefore significantly widen the bandwidth available to the APs.

In the following explanations, the operating bandwidth of an AP is denoted as "primary bandwidth part". The primary bandwidth part typically contains a set of primary and sometimes also secondary channels used by the AP to perform wireless transmissions with its associated STAs. The primary bandwidth part is subject to carrier sensing by the AP according to the rules defined in the IEEE 802.11 Specifications. One or more further bandwidth parts, which can be used by the AP based on sharing of a TXOP reserved by another AP, are denoted as secondary bandwidth part(s). On the secondary bandwidth part(s), the AP does not perform carrier sensing, but rather scans the channel(s) in the secondary bandwidth part to detect control frames indicating the occupation status of the medium, e.g., based on an MLSR functionality of the AP. Accordingly, the scanning of the secondary bandwidth part is limited in the sense that it is not performed with the purpose of actively gaining access to the medium. On the secondary bandwidth part, the AP would thus be able to receive only control frames, i.e., non-HT frames, and do energy detection. The number of secondary bandwidth parts which can be scanned by the AP can for example depend on how many receiver chains are supported by the AP.

In some scenarios, the cooperating APs may use MLSR operation for efficiently scanning the primary bandwidth parts used by other APs, in particular by listening to transmission of control frames. Such control frames may include RTS frames, MU-RTS (multi-user RTS) frames, and/or CTS frames. In this way, each AP can track the status of the medium on the primary bandwidth parts utilized by the other APs. The MLSR operation may for example be based on the Enhanced MLSR operation described in "Enhanced multilink single radio operation", Internet document IEEE 802.11-20/0562r3. In such cases, an RTS frame can be used for triggering switching between the primary bandwidth part and the secondary bandwidth part by the receiving STA.

Figure 3:
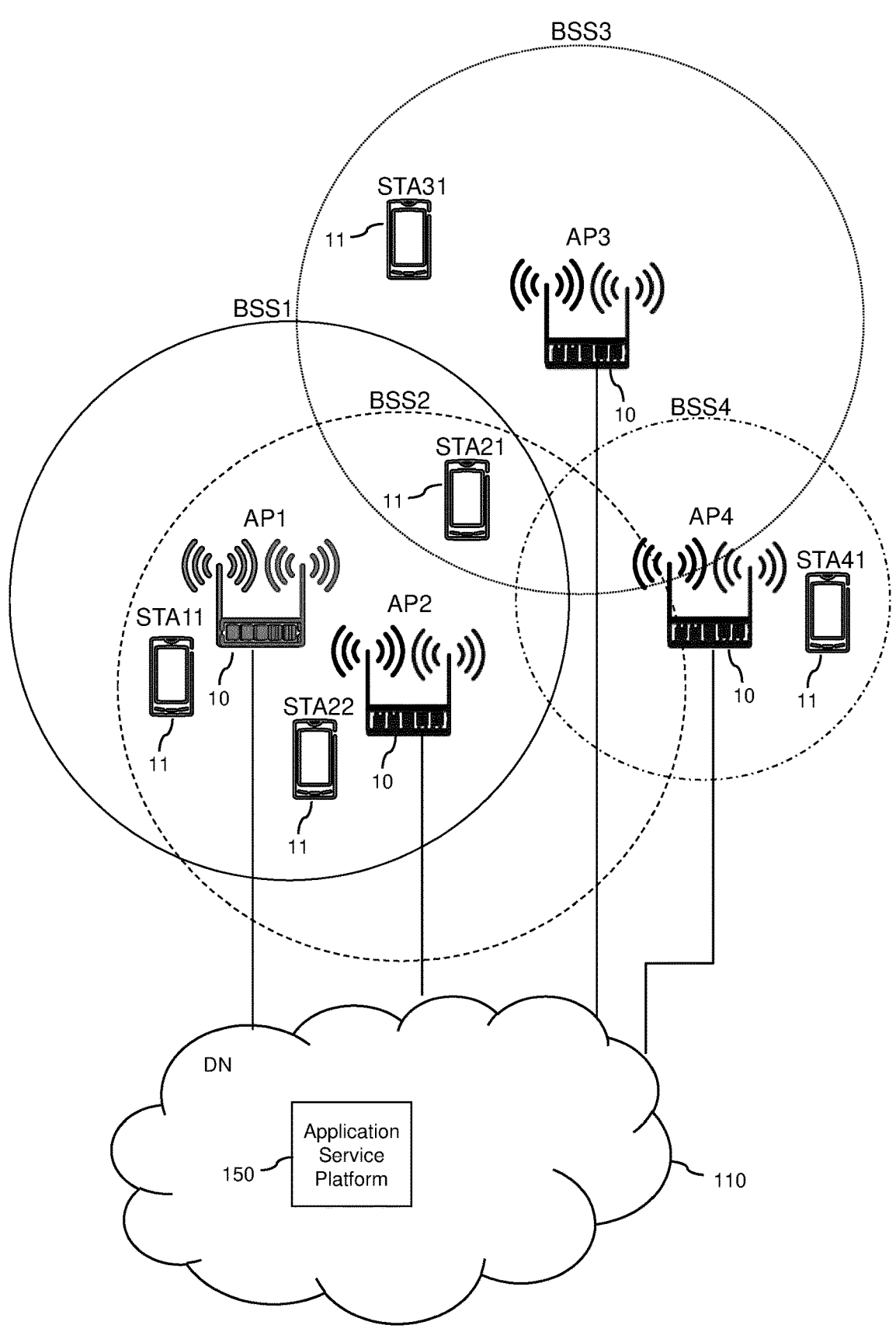
FIG. 3 schematically illustrates a wireless communication system according to an embodiment.

FIG. 3 illustrates an exemplary wireless communication system according to an embodiment. In the illustrated example, the wireless communication system includes multiple access points (APs) 10, in the illustrated example referred to as AP1, AP2, AP3, AP4, and multiple stations (STAs) 11, in the illustrated example referred to as STA11, STA21, STA22, STA31, STA32, and STA41. The station STA11 is served by AP1 (in a first BSS denoted as BSS1), the stations STA21 and STA22 are served by AP2 (in a second BSS denoted as BSS2). The stations STA31 and STA32 are served by AP3 (in a third BSS denoted as BSS3). The station STA41 is served by AP4 (in a fourth BSS denoted as BSS4). The stations 11 may correspond to various kinds of wireless devices, for example user terminals, such as mobile or stationary computing devices like smartphones, laptop computers, desktop computers, tablet computers, gaming devices, or the like. Further, the stations 11 could for example correspond to other kinds of equipment like smart home devices, printers, multimedia devices, data storage devices, or the like.

In the example of FIG. 3, each of the stations 11 may connect through a radio link to one of the APs 10. For example depending on location or channel conditions experienced by a given station 11, the station 11 may select an appropriate AP 10 and BSS for establishing the radio link. The radio link may be based on one or more OFDM carriers from a frequency spectrum which is shared on the basis of a contention based mechanism, e.g., an unlicensed band like the 2.4 GHz ISM band, the 5 GHz band, the 6 GHz band, or the 60 GHz band.

Figure 4:
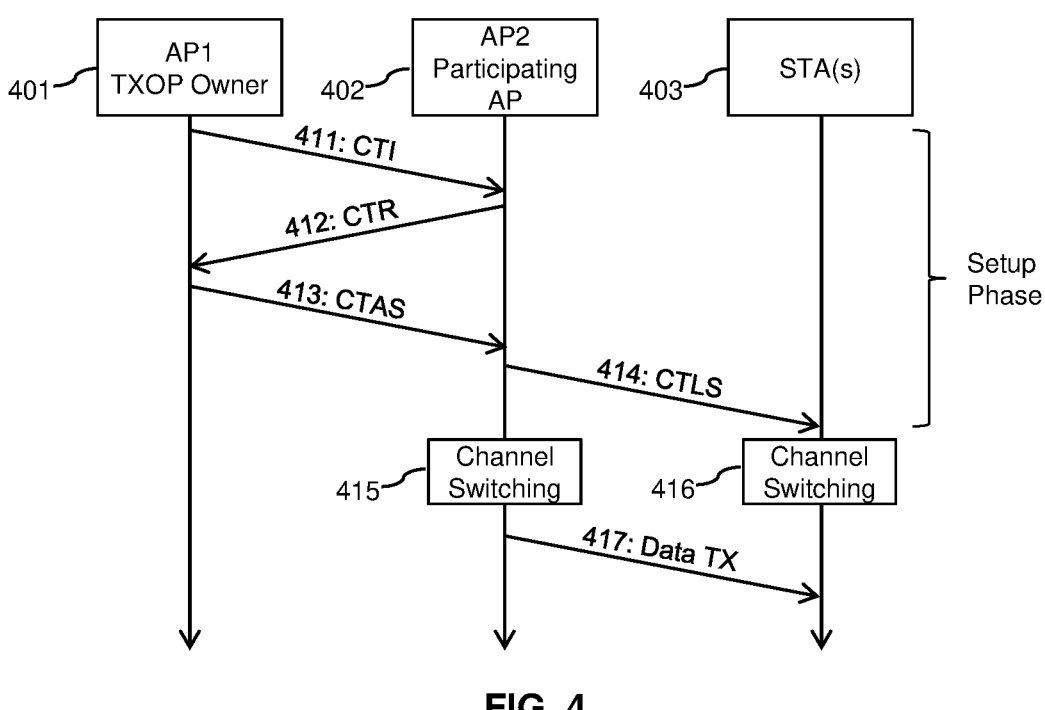
FIG. 4 schematically illustrates processes for sharing of a TXOP according to an embodiment.

Each AP 10 may provide data connectivity of the stations 11 connected to the AP 10. As further illustrated, the APs 10 may be connected to a data network (DN) 110. In this way, the APs 10 may also provide data connectivity of stations 11 connected to different APs 10. Further, the APs 10 may also provide data connectivity of the stations 11 to other entities, e.g., to one or more servers, service providers, data sources, data sinks, user terminals, or the like. Accordingly, the radio link established between a given station 11 and its serving AP 10 may be used for providing various kinds of services to the station 11, e.g., a voice service, a multimedia service, or other data service. Such services may be based on applications which are executed on the station 11 and/or on a device linked to the station 11. By way of example, FIG. 4 illustrates an application service platform 150 provided in the DN 110. The application(s) executed on the station 11 and/or on one or more other devices linked to the station 11 may use the radio link for data communication with one or more other stations 11 and/or the application service platform 150, thereby enabling utilization of the corresponding service(s) at the station 11.

To achieve high performance in a scenario like illustrated in FIG. 3, coordination between the cells or BSSs may be utilized. For example, at least some of the involved APs 10 may contend for and share common resources. In particular, two or more of the APs 10 may contend for the same wireless medium or radio channel in order to obtain a TXOP. Then, the winning AP 10 can share the resources with the other APs in a dynamic fashion. This AP 10 is also denoted as the sharing AP. For example, it can share the resources differently in different TXOPs. In the illustrated concepts, the sharing of the TXOP is assumed to be implemented over different bandwidth parts utilized by the participating APs, also allowing participation of APs which operate on another primary bandwidth part than the sharing AP.

To enable the sharing of the TXOP over the different bandwidth parts, an initial setup procedure may be performed. Such setup procedure may be performed in an explicit manner and/or in an implicit manner. The setup procedure may be used to provide APs which could potentially participate in the sharing of the TXOP with information to assist the participation. The setup procedure may for example be used to ensure that, once channel access is gained, all relevant control messages can be received by the associated STAs, e.g., by configuring all APs to use the same primary channel(s) within their respective primary bandwidth part. Further, the setup procedure can be used to ensure that each potentially participating AP is aware of the primary bandwidth part utilized by the other APs, so that each AP can scan for control frames on the other AP's primary bandwidth parts.

In an explicit part, the setup procedure may involve signaling between the APs, using one or more messages which include at least a part of the above-mentioned information.

The signaling in the explicit part of the setup procedure may include a broadcast message transmitted by one AP, to be received by other APs. The broadcast message may include information indicating on which primary bandwidth the AP operates and/or which primary channel(s) it utilizes. Typically, the broadcast message does not require a response, and the information in the broadcast message can be used by other APs as needed.

Alternatively or in addition, the signaling in the explicit part of the setup procedure may include a handshake, i.e., a two-way unicast message exchange, by which two or more APs, e.g., APs of an ESS, agree upon their respectively utilized primary bandwidth part and their respectively utilized primary channel(s).

Alternatively or in addition, the signaling in the explicit part of the setup procedure may include a multi-cast message exchange, in which a first AP transmits a multicast message to a group of second APs and then collects one or more responses to the multicast message. Here, not all second APs which received the multicast message need to send a response. The multicast message could for example indicate which primary bandwidth part and/or which primary channels are utilized by the first AP, and the response could indicate which primary bandwidth part is utilized by the responding second AP. Based on the response(s) the first AP can then inform the second APs which bandwidth parts should be scanned and send a broadcast or multicast message indicating this information to the second APs. This broadcast or multicast message could also indicate the primary channel(s) to be utilized.

In an implicit part, the setup procedure may involve that an AP listens to beacons from other APs. Based on the beacons, the AP can then derive the primary bandwidth utilized by the respective other AP, the primary channel(s) utilized by the respective other AP and/or the secondary channel(s) utilized by the respective other AP. Based on this information, the APs may then adapt their settings in such a way that the utilized primary channels are aligned and each AP scans the other AP's primary bandwidths.

FIG. 4 shows an example of processes TXOP sharing according to the illustrated concepts. Specifically, FIG. 4 illustrates a scenario where a first AP 401 has performed a CCA procedure and successfully gained access to one or more channels in its primary bandwidth part and reserves a TXOP which is shared with a second AP 402. In the example of FIG. 4, the first AP 401 thus is the TXOP owner or sharing AP and the second AP 402 is a participating AP or shared AP. The first AP 401 and the second AP 402 are assumed to operate on different primary bandwidth parts.

In the example of FIG. 4, the first AP 401 initiates the sharing of the TXOP by sending a CTI message 411. The CTI message 411 indicates that the first AP 401 has obtained a TXOP and, is willing to share its TXOP. The CTI message 411 may at the same time indicate reservation of the TXOP to other devices. Further, the CTI message 411 indicates the bandwidth part for which the TXOP was obtained, e.g., in terms of channel numbers or a bandwidth size and a starting channel number. The first AP 401 may transmit the CTI message 401 on the same link where the TXOP was obtained, i.e., in the bandwidth part indicated in the CTI message 411. In some scenarios, e.g., if the first AP 401 is a multi-link device, the CTI message 411 could also be transmitted on another link, e.g., in another bandwidth part than indicated in the CTI message 411.

The second AP 402 receives the CTI message 411 and responds with a CTR message 412, thereby indicating that it is willing to participate in the sharing of the TXOP. By means of the CTI message, AP1 notifies the other APs that it has obtained the TXOP and is willing to share it.

The first AP 401 then sends a CTAS message 413 to the second AP 402, to inform the second AP 402, i.e., the sharing AP, about its allocated resources and the TX start time in the shared TXOP. The second AP 402 then sends a CTLS message 414 to its associated STA(s) 403.

The CTLS message 414 informs the associated STA(s) 403 about their respectively allocated resources within the TXOP, according to local scheduling performed by the second AP 402. The CTLS message 414 further indicates to the associated STA(s) 403 whether switching to another channel is required and, if so, to what channel the STA should switch. As indicated by blocks 415 and 416, the example of FIG. 4 assumes that the second AP 402 and the associated STA(s) of the second AP 402 switch from a first channel, in the primary bandwidth part of the second AP 402, to a second channel in the bandwidth part for which the TXOP was obtained, as indicated by the CTI message 411. One or more data transmissions 417 from the second AP 402 to its associated STA(s) 403 are then performed in the shared TXOP.

The first AP 401 and the second AP 402 in the example of FIG. 4 could for example correspond to any of the APs 10 of FIG. 3. The STA(s) 403 in the example of FIG. 4 could for example correspond to any of the STAs 11 of FIG. 3.

Figure 5:
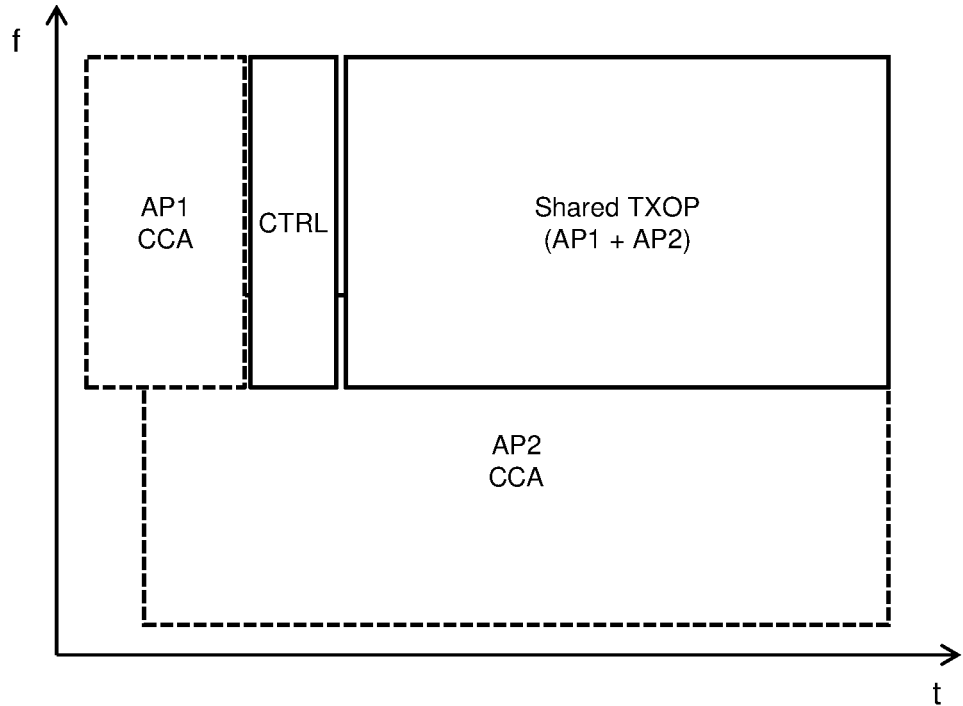
FIG. 5 schematically illustrates utilization of radio resources in sharing of a TXOP according to an embodiment.

FIG. 5 further illustrates, in frequency (f) and time (t) domain, how two APs can coordinate channel access in different bandwidth parts. The two APs are denoted as AP1 and AP2. In the example of FIG. 5, it is assumed that the two APs have initially coordinated to utilize common primary bandwidth part, e.g., a common primary channel of 20 MHz width. Moreover, each AP is aware of the other AP's primary bandwidth part and scans the other AP's primary bandwidth part for control frames. Accordingly, each of the APs maintains synchronization to the other AP's primary bandwidth part, e.g., by using Enhanced MLSR functionalities.

In the example of FIG. 5, AP1 successfully performs a CCA procedure in its primary bandwidth part, reserves a TXOP, and initiates sharing of the TXOP. For this purpose, AP1 performs control signaling (CTRL) for coordinating the sharing of the TXOP. This control signaling may involve transmission of the above-mentioned CTI message and/or CTAS message. AP1 replicates the control signaling over the entire primary bandwidth of AP1, thus also in the part which is common with AP2. As mentioned above, the control signaling for coordinating the sharing of the TXOP, e.g., the CTI message, can also indicate the reservation of the TXOP by AP1. Due to the scanning of the primary bandwidth part of AP1, AP2 detects that AP1 has reserved the TXOP and is willing to share it, e.g., based on the CTI message transmitted by AP1. In the example of FIG. 5, it is assumed that AP2 decides to participate in the sharing of the TXOP and sends a corresponding response to AP1. For example, AP2 may send a CTR message in the primary bandwidth part which is common with AP1, so that AP1 can detect the CTR message from AP2. To participate in the sharing of the TXOP for transmission of data to its associated STAs, AP2 then switches to the primary bandwidth part of AP2, where the TXOP was reserved, and also instructs its associated STAs to perform corresponding channel switching. At the same time, AP2 may continue to contend for access to its own primary bandwidth, by performing CCA procedure in its primary bandwidth.

As can be seen from the example of FIG. 5, AP2 can efficiently benefit from the CCA procedure performed by AP1 and utilize additional bandwidth without requiring that AP2 performs a CCA procedure in this additional bandwidth.

Figure 6:
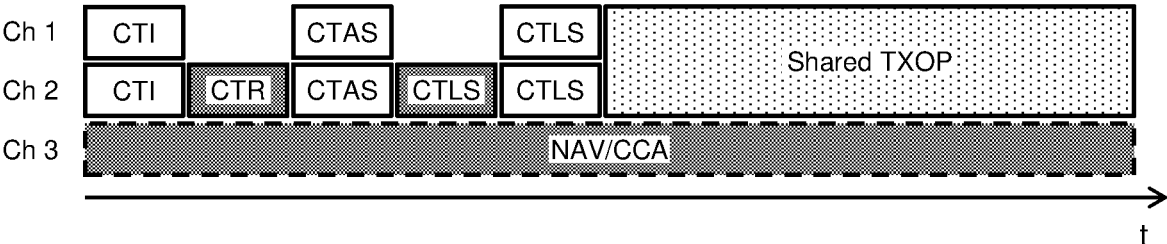
FIG. 6 schematically illustrates an example of utilization of multiple radio channels in sharing of a TXOP according to an embodiment.

FIG. 6 further illustrates procedures underlying the scenario of FIG. 5, assuming that the sharing of the TXOP is coordinated by signaling as illustrated in FIG. 4 and that three channels, e.g., each having a bandwidth of 20 MHz, are available in total. In this example, the primary bandwidth part of AP1 is formed of a first channel (Ch1) and a second channel (Ch2). The primary bandwidth part of AP2 is formed of the second channel and a third channel (Ch3). The second channel thus constitutes a common primary bandwidth part of AP1 and AP2. In FIG. 6, open boxes indicate transmissions by AP1, and dark shaded boxes indicate transmissions by AP2.

As can be seen from FIG. 6, for initiating the sharing of the TXOP in its own primary bandwidth part, i.e., on the first channel and the second channel, AP1 sends a CTI message on both the first channel and the second channel. Accordingly, the CTI is replicated over all channels of the primary bandwidth part of AP1.

Due to the scanning of the primary bandwidth part of AP1, AP2 detects the CTI message and responds with a CTR message indicating that AP2 is willing to participate in the sharing of the TXOP. AP2 sends the CTR message on the second channel, i.e., in the primary bandwidth part which is common with AP1, so that detection of the CTR message by AP1 is facilitated. AP1 then sends a CTAS message, informing AP2 about resources of the TXOP that can be used by AP2. As can be seen, also the CTAS message is sent on both the first channel and the second channel, and thus replicated over all channels of the primary bandwidth part of AP1. AP2 then sends a CTLS message, informing its associated STA(s) about one or more scheduled data transmissions in the TXOP reserved in another bandwidth part. Upon reception of the CTLS, the associated STA(s) switch to the corresponding channels, so that the data transmission(s) in the shared TXOP can be received. Over the entire process, AP2 may continue attempting access to the third channel, by performing a CCA procedure, or the third channel may be blocked to setting of a NAV (Network Allocation Vector).

Figure 7:
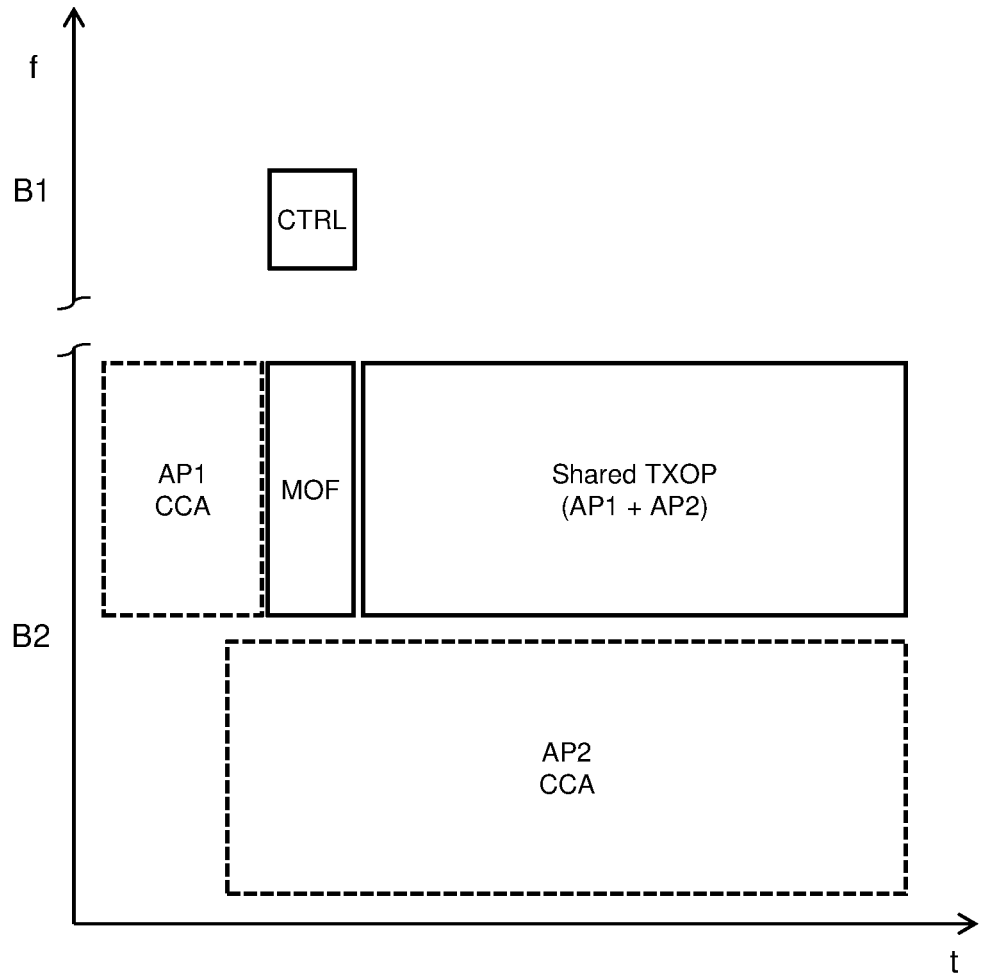
FIG. 7 schematically illustrates utilization of radio resources from multiple frequency band in sharing of a TXOP according to an embodiment.

In some scenarios, the APs participating in the sharing of a TXOP could also support multi-link operation in different bands. This may allow for implementing the coordinated channel access also for two or more APs which operate in non-overlapping bandwidth parts, e.g., of the 5 GHz or 6 GHz band. FIG. 7 illustrates a corresponding example.

In the example of FIG. 7, it is assumed that a first AP, denoted as AP1, and a second AP, denoted as AP2, share a common primary channel in a first band, denoted as 1. The common primary channel can for example have a width of 20 MHz. As explained in the following, the common primary channel can act as a control channel for coordinating the sharing of the TXOP. In a second band, denoted as B2, AP1 and AP2 utilize non-overlapping primary bandwidth parts.

Also in the example of FIG. 7, each AP is aware of the other AP's primary bandwidth part and scans the other AP's primary bandwidth part for control frames. Accordingly, each of the APs maintains synchronization to the other AP's primary bandwidth part, e.g., by using Enhanced MLSR functionalities.

In the example of FIG. 7, AP1 successfully performs a CCA procedure in its primary bandwidth part, reserves a TXOP, and initiates sharing of the TXOP. For this purpose, AP1 performs control signaling (CTRL) for coordinating the sharing of the TXOP on the common primary channel in the first band. This control signaling may involve transmission of the above-mentioned CTI message and/or CTAS message.

For indicating the reservation of the TXOP in its primary bandwidth, AP1 further triggers a medium occupancy frame (MOF) in its primary bandwidth part. The medium occupancy frame may for example correspond to a MU-RTS/CTS (Multi-User Ready-to-Send/Clear to Send) process as specified in the IEEE 802.1 lax Draft.

Due to the scanning of the primary bandwidth part of AP1, AP2 detects that AP2 has reserved the TXOP. Further, based on the control signaling on the primary channel in the first band, AP2 detects that AP1 is willing to share the TXOP and indicates to AP1 that it is willing to participate in the sharing of the TXOP. For example, AP2 may send a CTR message on the common primary channel in the first band, so that AP1 can detect the CTR message from AP2. To participate in the sharing of the TXOP for transmission of data to its associated STAs, AP2 then switches to the primary bandwidth part of AP2, where the TXOP was reserved, and also instructs its associated STAs to perform corresponding channel switching. At the same time, AP2 may continue to contend for access to its own primary bandwidth, by performing CCA procedure in its primary bandwidth.

Figure 8:
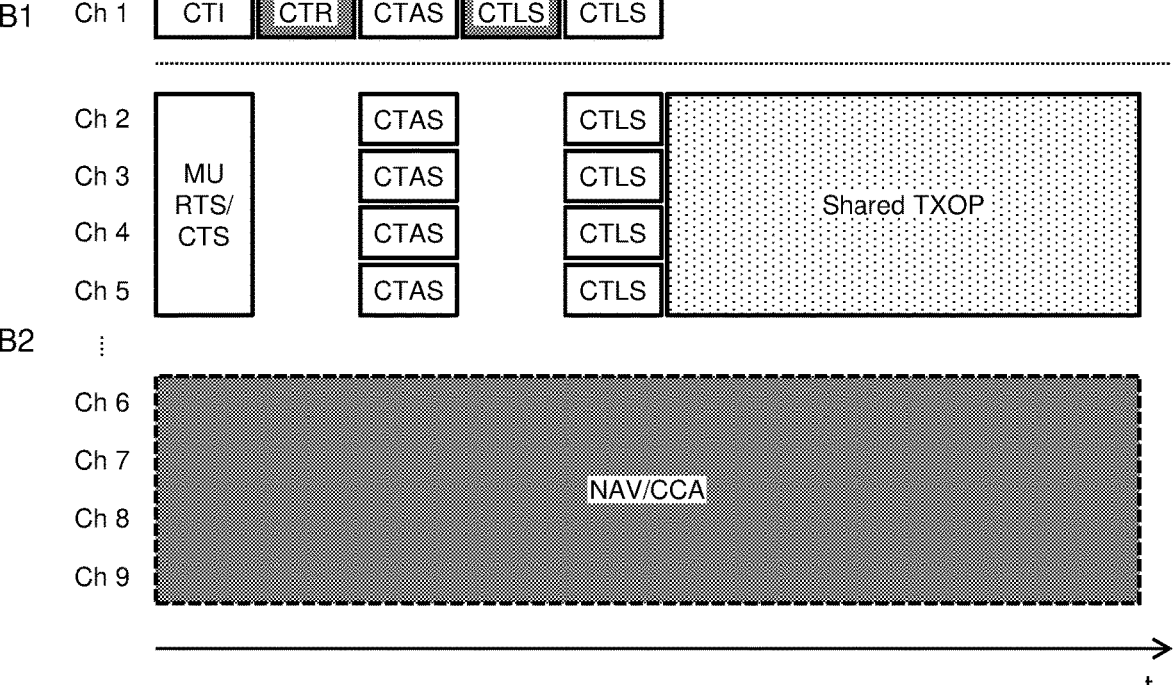
FIG. 8 schematically illustrates an example of utilization of multiple radio channels from multiple frequency bands in sharing of a TXOP according to an embodiment.

FIG. 8 further illustrates procedures underlying the scenario of FIG. 7, assuming that the sharing of the TXOP is coordinated by signaling as illustrated in FIG. 4 and that multiple channels, e.g., each having a bandwidth of 20 MHz, are available in the first band and the second band. In this example, a first channel (Ch1) is provided in the first band (1) and forms the common primary channel of AP1 and AP2. A set of second channels (Ch2, Ch3, Ch4, Ch5) forms the primary bandwidth part of AP1. A set of third channels (Ch6, Ch7, Ch8, Ch9) forms the primary bandwidth part of AP2. In FIG. 8, open boxes indicate transmissions by AP1, and dark shaded boxes indicate transmissions by AP2.

As can be seen from FIG. 8, for initiating the sharing of the TXOP in its own primary bandwidth part, i.e., on the set of second channels, AP1 sends a CTI message on the common primary channel in the first band and further triggers a MU RTS/CTS process in its primary bandwidth in the second band.

Due to the scanning of the primary bandwidth part of AP1, AP2 detects the reservation of the TXOP. Further, AP2 also detects the CTI message on the first channel and responds with a CTR message indicating that AP2 is willing to participate in the sharing of the TXOP. AP2 sends the CTR message on the first channel, i.e., in the common primary channel of AP1 and AP2. AP1 then sends a CTAS message on the first channel, informing AP2 about resources of the TXOP that can be used by AP2. As further illustrated, AP1 also sends the CTAS on the set of second channels, i.e., in its primary bandwidth part. This may facilitate including further APs, which operate in the primary bandwidth part of AP1, into the TXOP sharing process. AP2 then sends a CTLS message on the first channel, informing its associated STA(s) about one or more scheduled data transmissions in the TXOP reserved in another bandwidth part. Upon reception of the CTLS, the associated STA(s) switch to the corresponding channels, so that the data transmission(s) in the shared TXOP can be received. Still further, AP1 also sends a CTLS message to inform its own associated STA(s) about one or more scheduled data transmissions in the TXOP. As can be seen, AP1 sends the CTLS message on the first channel, i.e., the common primary channel, and on the set of second channels, i.e., in its own primary bandwidth part. Accordingly, the STA(s) associated with AP1 and also AP2 can be informed about the resources allocated to the STA(s) associated with AP1.

The notification of the associated STA(s) about the resources allocated in the TXOP can be performed without requiring any further coordination concerning the channels or bands the STA(s) should listen to. For this purpose, the CTLS message can sent both in the first band and the second band. For this purpose, AP2 would need to have access to the second band at the point of time when the CTLS needs to be sent, which is not necessarily the case. Alternatively, the APs can coordinate to ensure that all STAs listen to the first band with the common primary channel. Here, multi-link capable STAs may simultaneously listen to both the first band and the second band. Other STAs could be controlled to temporarily switch to the first band. After completion of the data transfer in the shared TXOP, all STAs may switch back to their original band, i.e., the band where the primary bandwidth of their associated AP is located.

As further illustrated in FIG. 8, over the entire TXOP sharing process AP2 may continue attempting access to the set of third channels, by performing a CCA procedure, or the third channels may be blocked to setting of a NAV.

For the IEEE 802.11 technology, different variants of multi-link channel access schemes may be considered: asynchronous channel access, synchronous channel access, and semi-synchronous channel access. In the case of asynchronous channel access, channel access is performed independently for each link. In the case of synchronous channel access and semi-synchronous channel access, channel access is performed simultaneously on all links. In the synchronous case gaining access on all links is required before transmitting. In the semi-synchronous case, gaining access on one link allows for transmitting on all links.

As can be seen, in the case of using synchronous or semi-synchronous channel access, procedures as explained in connection with FIGS. 7 and 8 can be implemented in a straightforward manner because both bands are always accessible at the same time. In the case of using asynchronous channels access, it could however occur that AP1 does not immediately get access to the first band to send the CTI message. Such situations may be addressed by AP1 deciding to refrain from sharing its TXOP and releasing the TXOP early. Alternatively, AP1 could start using the TXOP for some data transmissions with its own associated STAs and initiate sharing of the TXOP in a delayed manner, e.g., by sending the CTI when the TXOP has already started and AP1 gets access to the first band. The CTI could then indicate the remaining duration of the TXOP, and other APs could use this information to decide whether they want to participate in the sharing of the ongoing TXOP.

A benefit of using a common primary channel as control channel, like in the example of FIGS. 7 and 8, is that the APs can coordinate to select the common primary channel in such a way that the number of other devices using the common primary channel is as low as possible. This minimizes a risk of losing parts of the control signaling or not being able to get access to the common primary channel. Further, the common primary control channel can also be used for exchanging other information between the APs, e.g., information on respective secondary channels of the APs.

The coordinated channel access for sharing of a TXOP as assumed in the examples of FIGS. 7 and 8 may also offer benefits concerning transmission of data having strict latency requirements. For example, when assuming that in the scenario of FIG. 8 AP2 has low latency data to transmit, but cannot transmit the data because there is a NAV set on the channels of its primary bandwidth part, AP2 can avoid waiting for the NAV to expire and then perform a CCA procedure, which could result in significant latency. Rather, AP2 can join the TXOP sharing in the other bandwidth part and use the shared TXOP to perform the low-latency transmission.

Figure 9:
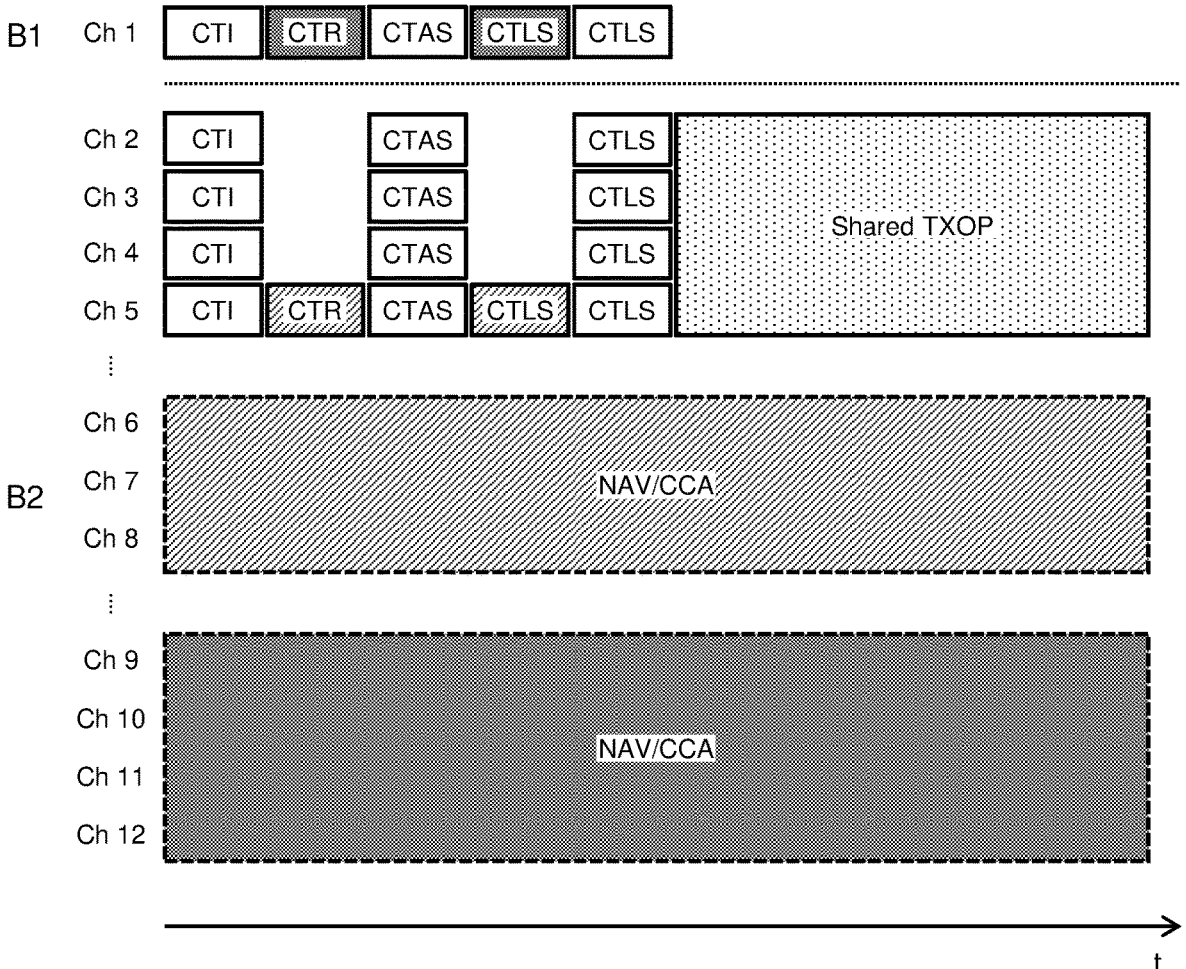
FIG. 9 schematically illustrates a further example of utilization of multiple radio channels from multiple frequency bands in sharing of a TXOP according to an embodiment.

As explained above, the illustrated concepts may be applied within a single band, utilizing a channel in a common bandwidth part for conveying control information, or in multiple bands, utilizing a common primary channel in a separate band for conveying control information. In some scenarios, it would also be possible to utilize multiple common channels for conveying the control information. Such multiple common channels may be spread over a single band or over two or more bands. Such utilization of multiple common channels may for example provide increased diversity. Further, the concepts as explained in connection with FIGS. 5 and 6 for a single band may also be combined with the concepts as explained in connection with FIGS. 7 and 8 for multiple bands. FIG. 9 illustrates a corresponding example.

In the example of FIG. 9, it is assumed that the illustrated concepts are applied for cooperating of multi-link APs with at least one single link AP. Specifically, the example of FIG. 9 assumes cooperation of a first AP, denoted as AP1, a second AP, denoted as AP2, and a third AP, denoted as AP3. AP1 and AP2 are assumed to be multi-link devices supporting simultaneous operation on a first band, denoted as 1, and a second band, denoted as B2. AP2 is assumed to be a single-link device supporting operation on only one band at a time, in the illustrated example the second band B2. In FIG. 9, open boxes indicate transmissions by AP1, diagonal-hatched boxes indicate transmissions by AP2, and dark shaded boxes indicate transmissions by AP3.

The example of FIG. 9 assumes that the sharing of a TXOP is coordinated by signaling as illustrated in FIG. 4 and that multiple channels, e.g., each having a bandwidth of 20 MHz, are available in the first band and the second band. In this example, a first channel (Ch1) is provided in the first band (1) and constitutes a common primary channel of AP1 and AP3. In the second band, a set of second channels (Ch2, Ch3, Ch4, Ch5) forms the primary bandwidth part of AP1, a set of third channels (Ch5, Ch6, Ch7, Ch8) forms the primary bandwidth part of AP2, and a set of fourth channels (Ch9, Ch10, Ch11, Ch12) forms the primary bandwidth part of AP3.

In the example of FIG. 9, AP1 and AP2, share a common primary channel in the first band, namely the channel denoted by Ch5. This channel is part of an overlap of the primary bandwidth part of AP1 and the primary bandwidth part of AP2 and constitutes a common primary channel of AP1 and AP2. As explained in the following, the common primary channel AP1 and AP2 and the common primary channel of AP1 and AP3 are used as control channels for coordinating the sharing of the TXOP.

Also in the example of FIG. 9, each AP is aware of the other APs' primary bandwidth part and scans the other APs' primary bandwidth part for control frames. Accordingly, each of the APs maintains synchronization to the other APs' primary bandwidth part, e.g., by using Enhanced MLSR functionalities.

In the example of FIG. 9, AP1 successfully performs a CCA procedure in its primary bandwidth part, i.e., on the set of second channels, reserves a TXOP on the set of second channels, and initiates sharing of the TXOP. As can be seen from FIG. 9, for initiating the sharing of the TXOP AP1 sends a CTI message. The CTI message is replicated on the common primary channel of AP1 and AP3 in the first band and on the second channels, i.e., on each channel of the primary bandwidth part of AP1, which also includes the common primary channel of AP1 and AP2, i.e., the channel denoted by Ch5. Further, AP1 also sends the CTI message on the common primary channel of AP1 and AP3 in the first band, i.e., on the channel denoted by Ch1.

Due to the scanning of the primary bandwidth part of AP1, AP2 and AP3 detect the CTI message transmitted on the second channels. The CTI message may at the same time also indicate reservation of the TXOP on the second channels. Further, AP3 also detects the CTI message transmitted on the common primary channel of AP1 and AP3 in the first band.

In the example of FIG. 9, it is assumed that AP2 and AP3 both decide to participate in the sharing of the TXOP on the second channels. Accordingly, AP2 responds with a CTR message indicating that AP2 is willing to participate in the sharing of the TXOP. AP2 sends the CTR message on the common primary channel of AP1 and AP2, i.e., the channel denoted by Ch5. Further, also AP3 responds with a CTR message indicating that AP3 is willing to participate in the sharing of the TXOP. AP3 sends the CTR message on the common primary channel of AP1 and AP3 in the first band, i.e., the channel denoted by Ch1.

AP1 then sends a CTAS message, informing AP2 and AP3 about resources of the TXOP that can be used by AP2 and AP3. The CTAS message is replicated on the common primary channel of AP1 and AP3 in the first band and on the second channels, i.e., on each channel of the primary bandwidth part of AP1, which also includes the common primary channel of AP1 and AP2, i.e., the channel denoted by Ch5. Further, AP1 also sends the CTAS message on the common primary channel of AP1 and AP3 in the first band, i.e., on the channel denoted by Ch1. Accordingly, the CTAS message can be received by each participating AP, irrespective of the utilized band an primary bandwidth part of the AP.

AP2 then sends a CTLS message on the common primary channel of AP1 and AP2 in the overlap of the primary bandwidth parts of AP1 and AP2, i.e., on the channel denoted by Ch5. By means of the CTLS message, AP2 informs its associated STA(s) about one or more scheduled data transmissions in the TXOP reserved on the second channels. Upon reception of the CTLS, the associated STA (s) switch to the corresponding channels, so that the data transmission(s) in the shared TXOP can be received.

Also AP3 sends a CTLS message to inform its associated STA(s) about one or more scheduled data transmissions in the TXOP reserved on the second channels. AP3 sends the CTLS message on the common primary channel of AP1 and AP3 in the first band, i.e., on the channel denoted by Ch1. By means of the CTLS message, AP2 Upon reception of the CTLS, the associated STA(s) switch to the corresponding channels, so that the data transmission(s) in the shared TXOP can be received.

Further, also AP1 sends a CTLS message to inform its own associated STA(s) about one or more scheduled data transmissions in the TXOP. As can be seen, AP1 sends the CTLS on the common primary channel of AP1 and AP3 in the first band, i.e., the channel denoted by Ch1, and on the second channels, i.e., in its own primary bandwidth part. Accordingly, the STA(s) associated with AP1, and also AP2 and AP3 can be informed about the resources allocated to the STA(s) associated with AP1.

As further illustrated in FIG. 9, over the entire TXOP sharing process AP2 may continue attempting access to the set of third channels, by performing a CCA procedure, or the third channels may be blocked to setting of a NAV. Similarly, AP3 may continue attempting access to the set of fourth channels, by performing a CCA procedure, or the fourth channels may be blocked to setting of a NAV.

In the above examples, an AP and its associated STA(s) may thus switch from its primary bandwidth part to another bandwidth part to participate in sharing of a TXOP on the other bandwidth part. After the TXOP, the AP may return to its original primary bandwidth part. Alternatively, the AP could continue operation on the other bandwidth part. The other bandwidth part would then become the new primary bandwidth part of the AP, which could then be considered by repeating at least a part of the above-mentioned setup procedure to inform other APs about the change of the primary bandwidth part of the AP.

Figure 10:
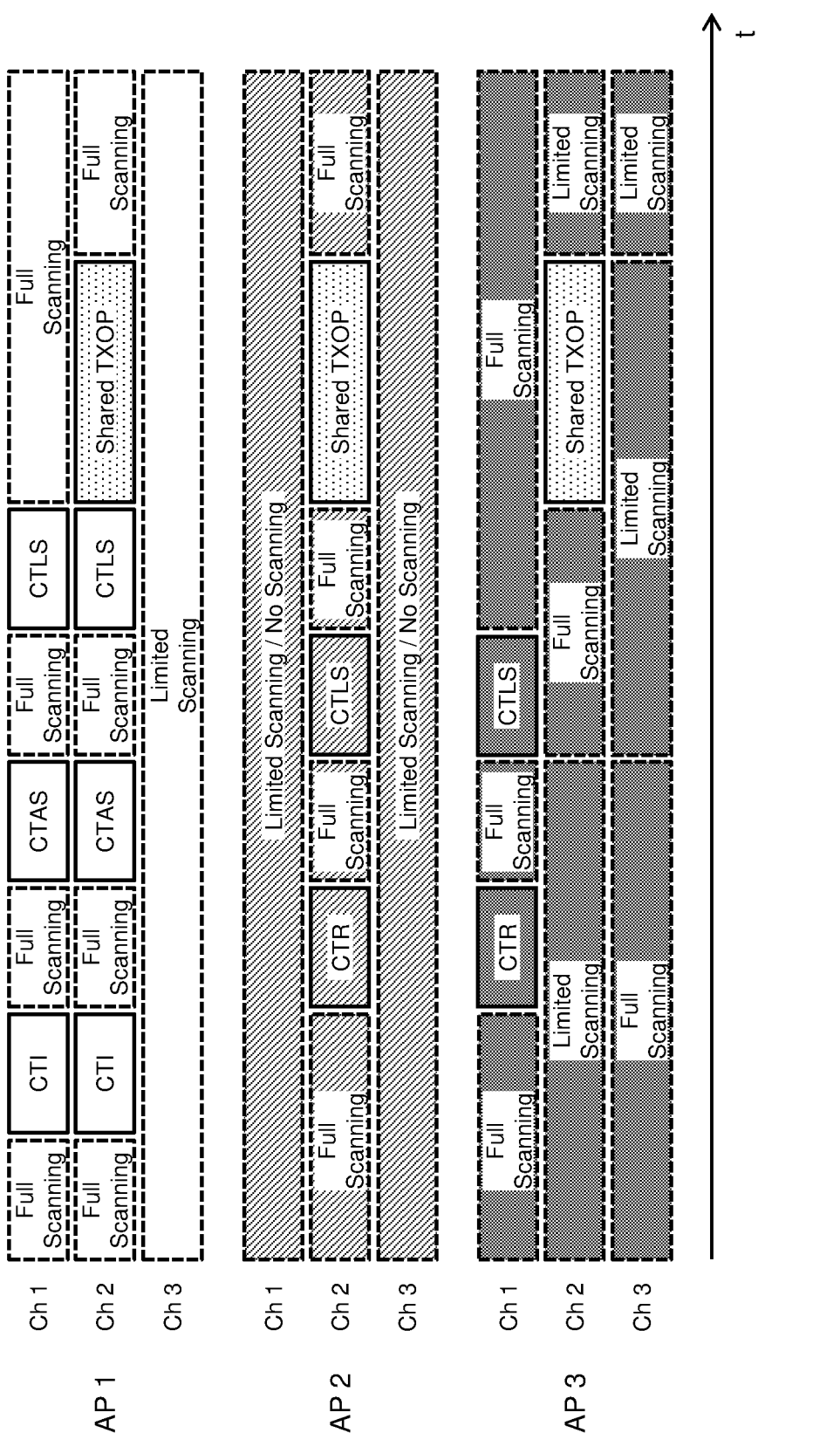
FIG. 10 shows an example for illustrating further details of scanning bandwidth parts in sharing of a TXOP according to an embodiment.

FIG. 10 shows an example of a TXOP sharing process in accordance with the above principles, further illustrating possibilities of scanning other APs' primary bandwidth part. In the example of FIG. 3, it is assumed that there are three cooperating APs, denoted by AP1, AP2, and AP3, and that these APs utilize three channels, denoted as Ch1, Ch2, Ch3. Among the APs, AP1 and AP3 are assumed to have two radio processing chains, whereas AP2 has only one radio processing chain. In FIG. 10, full scanning refers to CCA operation in accordance with the requirements of the IEEE 802.11 Specifications, while limited scanning refers to the above-mentioned scanning to detect control frames, e.g., based on MLSR functionalities. In FIG. 10, open boxes indicate transmissions by AP1, diagonal-hatched boxes indicate transmissions by AP2, and dark shaded boxes indicate transmissions by AP3.

As can be seen from FIG. 10, an AP equipped with more than one radio processing chains, like AP1 and AP3, can simultaneously perform full scanning on more than one channel. In addition, the AP can perform limited scanning on still further channels. By way of example, in the example of FIG. 10, AP1 initially performs full scanning on channel Ch1 and channel Ch2, while at the same time AP1 performs limited scanning on Ch3. Similarly, AP3 initially performs full scanning on channel Ch1 and channel Ch3, while at the same time AP3 performs limited scanning on Ch2.

In the example of FIG. 10, it is assumed that AP1 gains access to channel Ch2, reserves a TXOP on channel Ch2, and decides to share it on channel Ch1 and Ch2, provided that channel Ch1 is available in accordance with the principles of asynchronous, synchronous, or semi-synchronous channel access. AP2 then indicates on channel Ch2 that it wants to participate in the sharing of the TXOP, and AP3 indicates on channel Ch1 that it wants to participate in the sharing of the TXOP. Details of the sharing process can be as explained in the example of FIG. 9. In the example of FIG. 10, it should be noted that after receiving the CTAS message on channel Ch1, AP3 may need to retune its antennas, so that it can then do full scanning on the channel Ch2 while keeping at least one of its radio processing chains tuned to channel Ch3. In this way, AP3 may keep synchronization with channel Ch3, enabling AP3 to efficiently return to full scanning of Ch3 after the shared TXOP.

In the examples of FIG. 5 to 10, AP1, AP2, and AP3 could for example correspond to any of the APs 10 of FIG. 3. In each example, the cooperating APs may be APs of the same ESS.

Figure 11:
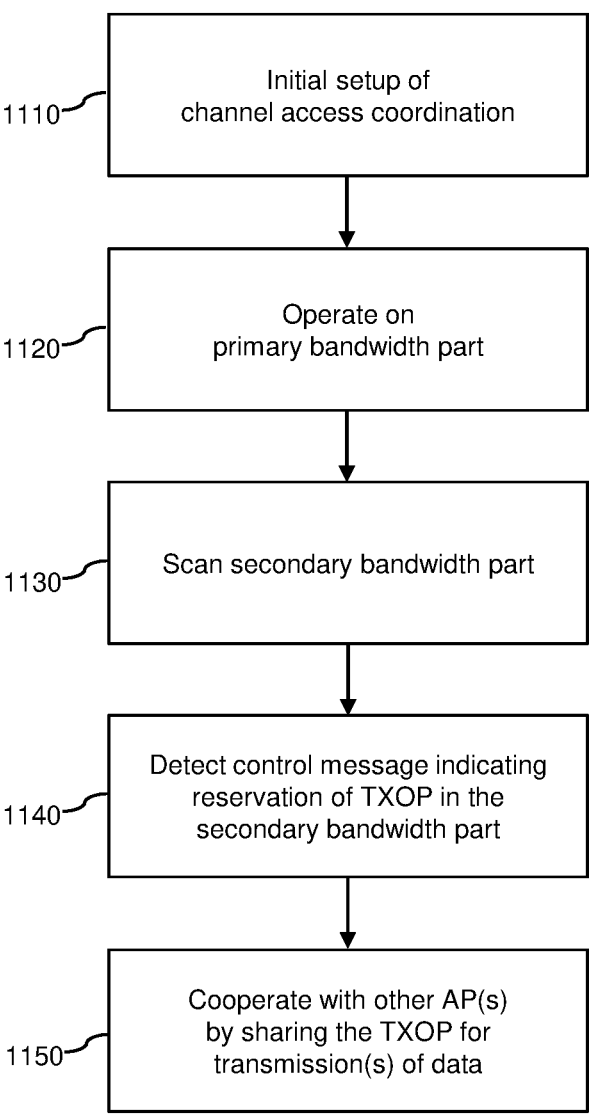
FIG. 11 shows a flowchart for schematically illustrating a method according to an embodiment.

FIG. 11 shows a flowchart for illustrating a method, which may be utilized for implementing the illustrated concepts. The method of FIG. 11 may be used for implementing the illustrated concepts in an AP for a wireless communication system, in particular in an AP which operates as a shared AP. The wireless communication system may be based on a wireless local area network, WLAN, technology, e.g., according to the IEEE 802.11 standards family. The AP may for example correspond to any of the above-mentioned APs 10.

If a processor-based implementation of the AP is used, at least some of the steps of the method of FIG. 11 may be performed and/or controlled by one or more processors of the AP. Such AP may also include a memory storing program code for implementing at least some of the below described functionalities or steps of the method of FIG. 11.

At step 1110, the AP may perform initial setup for channel access coordination. The initial setup may for example involve that, the AP receives configuration information from another AP. The configuration information may indicate a bandwidth part of the medium on which the other AP is operating.

In some scenarios, the AP may receive at least a part of the configuration information in a broadcast message transmitted by the other AP. Alternatively or in addition, the AP may receive at least a part of the configuration information in a unicast handshake message exchange between the AP and the other AP. Alternatively or in addition, the AP may receive at least a part of the configuration information in a multicast handshake message exchange in a group of APs which includes the AP and the other access AP, e.g., in a process in which one AP sends a multicast message to the other APs of the group, and at least some of the other APs respond to the multicast message. The configuration information may then for example be determined from these responses.

In some scenarios, step 1110 may also involve that the AP detects one or more beacons transmitted by the one or more other APs. Such beacons may then be analyzed to derive a bandwidth part and/or one or more channels on which the other AP operates.

At step 1120, the AP operates on a primary bandwidth part of a medium. This operation on the primary bandwidth part is based on carrier sensing to gain access to the primary bandwidth part of the medium. This may involve performing a CCA procedure to assess whether the medium is occupied. As for example defined in the IEEE 802.11 Specifications, the CCA procedure may be based on a contention window which is extended with each unsuccessful access attempt. In some scenarios, the CCA procedure may be performed during or before the initial setup of step 1110, and the AP may then detect control messages on the primary bandwidth part to track an occupation status of the bandwidth part, i.e., to keep synchronization.

At step 1130, the AP scans a secondary bandwidth part of the medium to detect control messages transmitted on the secondary bandwidth part. The scanning of step 1130 is performed without performing carrier sensing to gain access to the secondary bandwidth part of the medium. The control messages detected by the scanning may be used to track an occupation status of the secondary bandwidth part, i.e., keep synchronization with the secondary bandwidth part.

The AP may select the secondary bandwidth part based on received configuration information, e.g., configuration information as received from another AP in step 1110. The AP may then select the secondary bandwidth part in such a way that corresponds to or includes the bandwidth part on which the other AP operates. In some cases, the AP select the secondary bandwidth based on implicitly derived information, e.g., based one or more beacons from the other AP, which were detected at step 1110.

At step 1140, the AP detects a control message indicating that another AP reserved a TXOP on the secondary bandwidth part of the medium.

In some scenarios, the detected control message may include an invitation to participate in sharing of the TXOP, e.g., like the above-mentioned CTI message. However, it is noted that other typed of control messages may be detected as well, in particular control messages which enable tracking of the occupation status of the secondary bandwidth part. Such control messages could include RTS messages, MU-RTS messages, or CTS messages.

In some scenarios, the detected control message may indicate a bandwidth part for which the TXOP was obtained.

In some scenarios, the detected control message may be transmitted on the secondary bandwidth part, e.g., like in the examples of FIGS. 5 and 6.

In some scenarios, the detected control message may be transmitted in the primary bandwidth part, e.g., like in the examples of FIGS. 7 and 8.

In some scenarios, the detected control message may be transmitted on a channel commonly used by the AP and the other AP.

At step 1150, in response to the control message detected at step 1140, the AP cooperates with the other AP by sharing the TXOP for performing one or more transmissions of data. While sharing the TXOP for performing the one or more transmissions of data, the AP may maintaining synchronization with the primary bandwidth part, e.g., by monitoring the primary bandwidth part to detect control messages and tracking the occupation status of the primary bandwidth part based on the detected control messages. Also here, the detected control messages may include CTI messages, RTS messages, MU-RTS messages, and/or CTS messages.

In step 1150, the AP may for example use resources of the shard TXOP for sending one or more transmissions of data to one or more STA(s) associated with the AP. For this purpose, the AP may also instruct at least some of the STAs to perform channel switching to the secondary bandwidth part.

Figure 12:
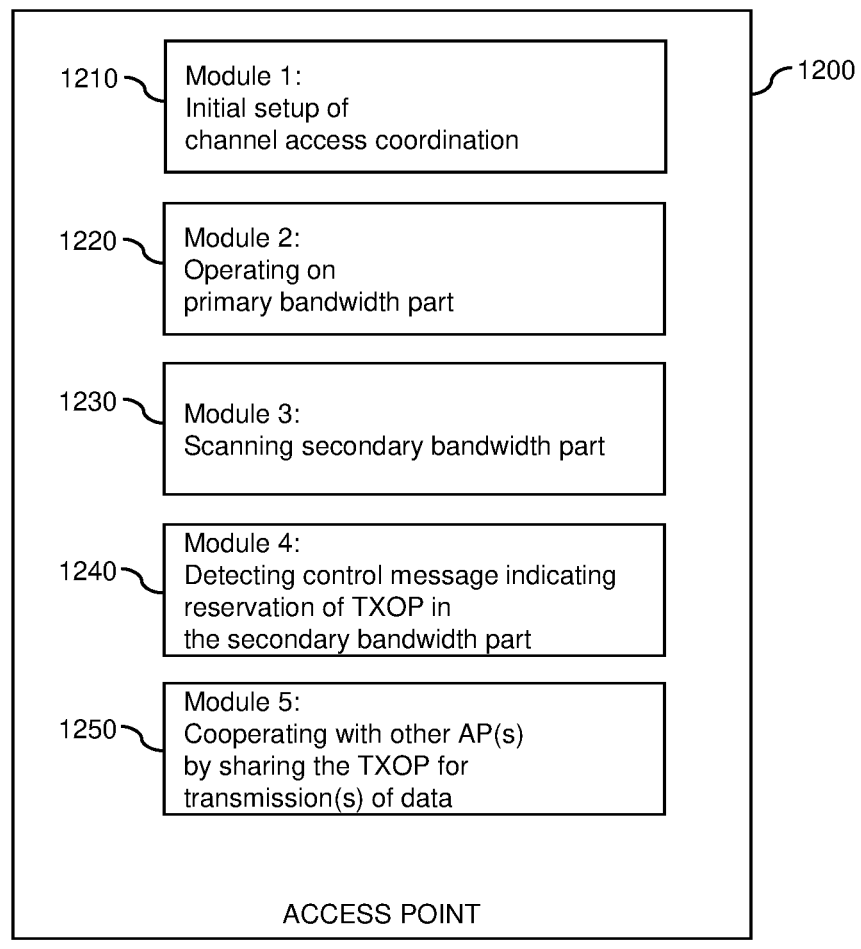
FIG. 12 shows a block diagram for schematically illustrating functionalities of an AP according to an embodiment.

FIG. 12 shows a block diagram for illustrating functionalities of an AP 1200 which operates according to the method of FIG. 11. The AP 1100 may for example correspond to one of above-mentioned APs 10. As illustrated, the AP 1200 may be provided with a module 1210 configured to perform initial setup for channel access coordination, such as explained in connection with step 1110. Further, the AP 1200 may be provided with a module 1220 configured to operate on a primary bandwidth part, such as explained in connection with step 1120. Further, the AP 1200 may be provided with a module 1130 configured to scan a secondary bandwidth part, such as explained in connection with step 1130. Further, the AP 1200 may be provided with a module 1140 configured to send detect a control message indicating that another AP reserved a TXOP on the secondary bandwidth part of the medium, such as explained in connection with step 1140. Further, the AP 1200 may be provided with a module 1150 configured to cooperate with the other AP by sharing the TXOP, such as explained in connection with step 1150.

It is noted that the AP 1200 may include further modules for implementing other functionalities, such as known functionalities of a WLAN AP. Further, it is noted that the modules of the AP 1200 do not necessarily represent a hardware structure of the AP 1200, but may also correspond to functional elements, e.g., implemented by hardware, software, or a combination thereof.

Figure 13:
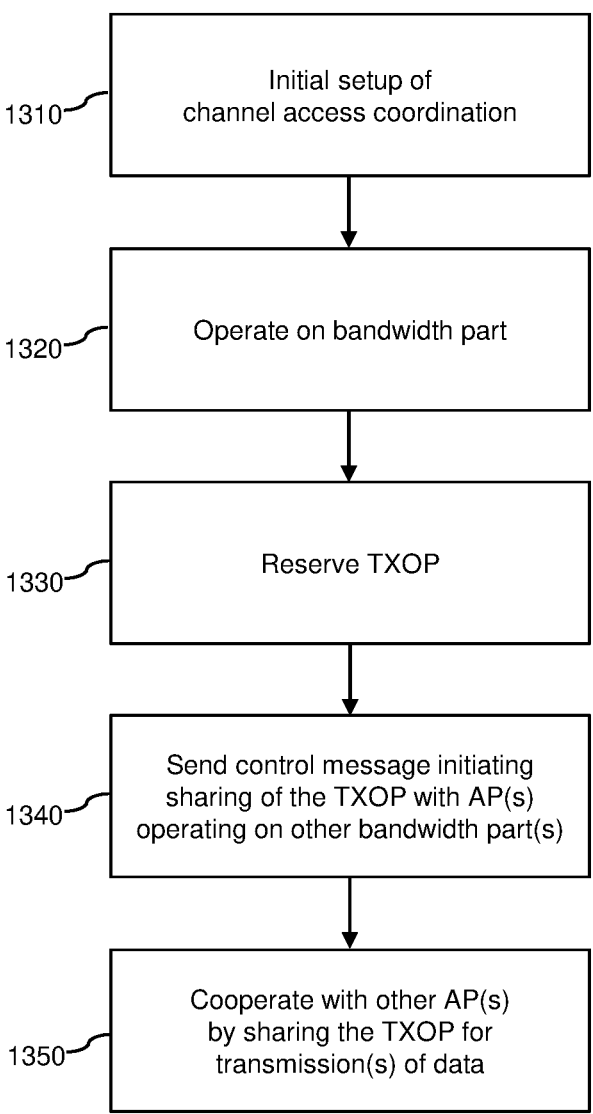
FIG. 13 shows a flowchart for schematically illustrating a method according to a further embodiment.

FIG. 13 shows a flowchart for illustrating a method, which may be utilized for implementing the illustrated concepts. The method of FIG. 13 may be used for implementing the illustrated concepts in an AP for a wireless communication system, in particular in an AP which operates as a sharing AP. The wireless communication system may be based on a wireless local area network, WLAN, technology, e.g., according to the IEEE 802.11 standards family. The AP may for example correspond to any of the above-mentioned APs 10.

If a processor-based implementation of the AP is used, at least some of the steps of the method of FIG. 13 may be performed and/or controlled by one or more processors of the AP. Such AP may also include a memory storing program code for implementing at least some of the below described functionalities or steps of the method of FIG. 13.

At step 1310, the AP may perform initial setup for channel access coordination. The initial setup may for example involve that, the AP sends configuration information to another AP. The configuration information may indicate a bandwidth part of the medium on which the AP is operating.

In some scenarios, the AP may receive at least a part of the configuration information in a broadcast message transmitted by the other AP. Alternatively or in addition, the AP may receive at least a part of the configuration information in a unicast handshake message exchange between the AP and the other AP. Alternatively or in addition, the AP may receive at least a part of the configuration information in a multicast handshake message exchange in a group of APs which includes the AP and the other access AP, e.g., in a process in which one AP sends a multicast message to the other APs of the group, and at least some of the other APs respond to the multicast message. The configuration information may then for example be determined from these responses.

In some scenarios, step 1310 may also involve that the AP detects one or more beacons transmitted by the one or more other APs. Such beacons may then be analyzed to derive a bandwidth part and/or one or more channels on which the other AP operates.

At step 1320, the AP operates on a bandwidth part of a medium. This operation on the bandwidth part is based on carrier sensing to gain access to the bandwidth part of the medium. This may involve performing a CCA procedure to assess whether the medium is occupied. As for example defined in the IEEE 802.11 Specifications, the CCA procedure may be based on a contention window which is extended with each unsuccessful access attempt. In some scenarios, the CCA procedure may be performed during or before the initial setup of step 1310, and the AP may then detect control messages on the bandwidth part to track an occupation status of the bandwidth part, i.e., to keep synchronization.

At step 1330, in response to gaining access to the bandwidth part at step 1320, the AP reserves TXOP on the bandwidth part of the medium.

At step 1340, the AP sends a control message for initiating sharing of the TXOP with one or more other APs operating on another bandwidth part of the medium.

In some scenarios, the control message may include an invitation to participate in sharing of the TXOP, e.g., like the above-mentioned CTI message. However, it is noted that other types of control messages could be sent as well, in particular control messages which enable tracking of the occupation status of the secondary bandwidth part. Such control messages could include RTS messages, MU-RTS messages, or CTS messages.

In some scenarios, the control message may indicate a bandwidth part for which the TXOP was obtained.

In some scenarios, the control message may be transmitted on the secondary bandwidth part, e.g., like in the examples of FIGS. 5 and 6.

In some scenarios, the control message may be transmitted in the primary bandwidth part, e.g., like in the examples of FIGS. 7 and 8.

In some scenarios, the control message may be transmitted on a channel commonly used by the AP and the other AP.

At step 1350, the AP cooperates with the one or more other AP by sharing the TXOP for performing one or more transmissions of data. In step 1350, the AP may for example use resources of the shared TXOP for sending one or more transmissions of data to one or more STA(s) associated with the AP.

Figure 14:
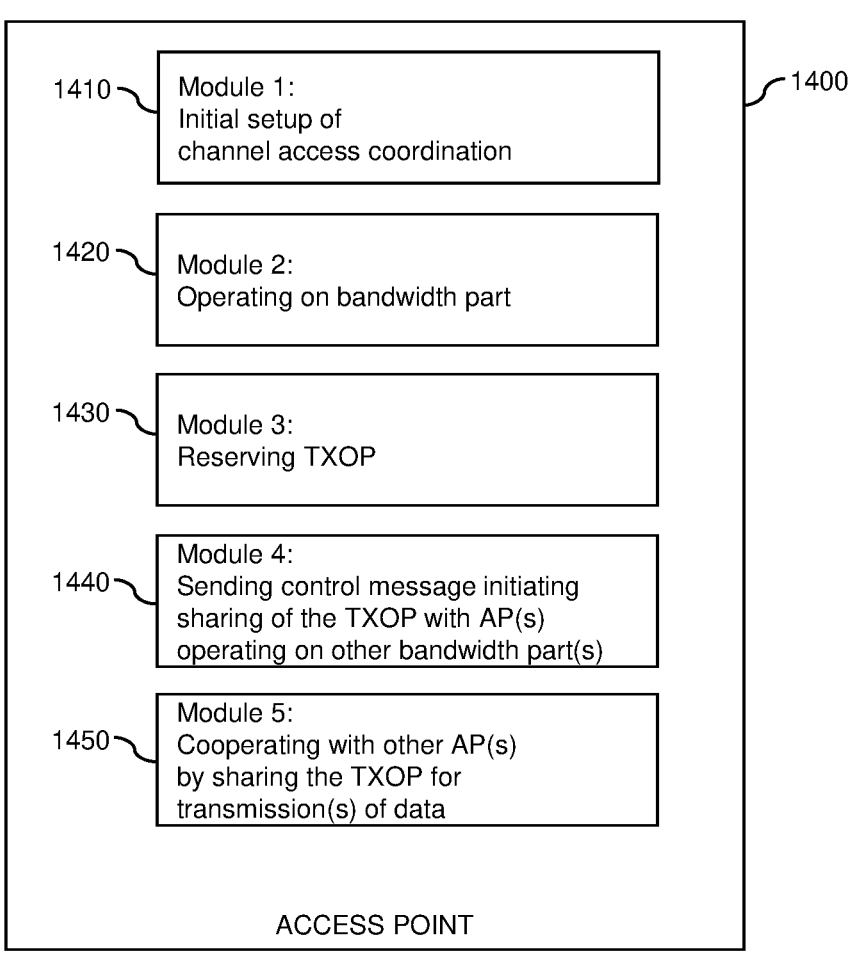
FIG. 14 shows a block diagram for schematically illustrating functionalities of an AP according to a further embodiment.

FIG. 14 shows a block diagram for illustrating functionalities of an AP 1400 which operates according to the method of FIG. 13. The AP 1400 may for example correspond to one of above-mentioned APs 10. As illustrated, the AP 1400 may be provided with a module 1410 configured to perform initial setup for channel access coordination, such as explained in connection with step 1310. Further, the AP 1400 may be provided with a module 1320 configured to operate on a bandwidth part, such as explained in connection with step 1320. Further, the AP 1400 may be provided with a module 1430 configured to reserve a TXOP, such as explained in connection with step 1330. Further, the AP 1400 may be provided with a module 1440 configured to send a control message for initiating sharing of the TXOP with one or more other APs operating on another bandwidth part of the medium, such as explained in connection with step 1340. Further, the AP 1400 may be provided with a module 1350 configured to cooperate with the one or more other APs by sharing the TXOP, such as explained in connection with step 1350.

It is noted that the AP 1400 may include further modules for implementing other functionalities, such as known functionalities of a WLAN AP. Further, it is noted that the modules of the AP 1400 do not necessarily represent a hardware structure of the AP 1400, but may also correspond to functional elements, e.g., implemented by hardware, software, or a combination thereof.

It is noted that the functionalities as described in connection with FIGS. 11 to 14 could also be implemented in a system, e.g., a system including an AP operating as sharing AP according to the method of FIG. 13 and one or more further APs operating as shared APs according to the method of FIG. 11. Further, the same AP could operate according to both the method of FIG. 11 and the method of FIG. 13, e.g., depending on whether the AP itself has gained access to the medium and reserved a TXOP. The coordinated channel access could thus involve that two APs operating on different primary bandwidth parts mutually provide the other AP with access to a TXOP on their own primary bandwidth part. Further, such system could include one or more STAs associated with the APs.

Figure 15:
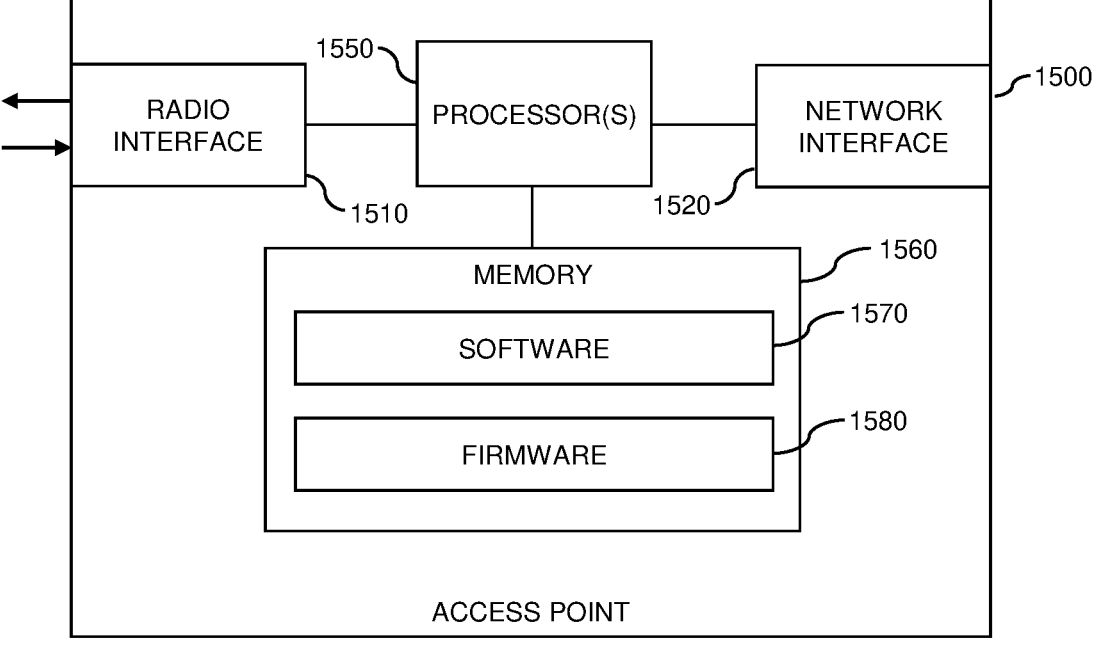
FIG. 15 schematically illustrates structures of an AP according to an embodiment.

FIG. 15 illustrates a processor-based implementation of an AP 1500 which may be used for implementing the above-described concepts. For example, the structures as illustrated in FIG. 15 may be used for implementing the concepts in any of the above-mentioned APs 10.

As illustrated, the AP 1500 includes one or more radio interfaces 1510. The radio interface(s) 1510 may for example be based on a WLAN technology, e.g., according to an IEEE 802.11 family standard. However, other wireless technologies could be supported as well, e.g., the LTE technology or the NR technology. In some scenarios, the radio interface(s) 1510 may be based on multiple antennas of the AP 1500 and support beamformed multi-antenna port transmission to enable spatial multiplexing of wireless transmissions. As further illustrated, the AP 1500 may also include one or more network interfaces 1520 which may be used for communication with other nodes of a wireless communication network, e.g., with other APs or with an application service platform as illustrated in FIG. 3.

Further, the AP 1500 may include one or more processors 1550 coupled to the radio interface(s) 1510 and a memory 1560 coupled to the processor(s) 1550. By way of example, the radio interface(s) 1510, the processor(s) 1550, and the memory 1560 could be coupled by one or more internal bus systems of the AP 1500. The memory 1560 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1560 may include software 1570 and/or firmware 1580. The memory 1560 may include suitably configured program code to be executed by the processor(s) 1550 so as to implement the above-described functionalities for controlling wireless transmissions, such as explained in connection with FIGS. 11 to 14.

It is to be understood that the structures as illustrated in FIG. 15 are merely schematic and that the AP 1500 may actually include further components which, for the sake of clarity, have not been illustrated, e.g., further interfaces or further processors. Also, it is to be understood that the memory 1560 may include further program code for implementing known functionalities of a WLAN AP. According to some embodiments, also a computer program may be provided for implementing functionalities of the AP 1500, e.g., in the form of a physical medium storing the program code and/or other data to be stored in the memory 1560 or by making the program code available for download or by streaming.

As can be seen, the concepts as described above may be used for efficient utilization of multiple bandwidth parts. In particular, an AP can be allowed to utilize additional bandwidth by TXOP sharing, without requiring that the AP performs a complete CCA procedure to gain access to the additional bandwidth.

It is to be understood that the examples and embodiments as explained above are merely illustrative and susceptible to various modifications. For example, the illustrated concepts may be applied in connection with various kinds of wireless technologies, without limitation to WLAN technologies. Further, the concepts may be applied with respect to various types of APs and STAs. Further, it is noted that the illustrated concepts can be applied to various types of resource sharing in the TXOP, e.g., OFDMA, TDMA, spatial multiplexing, or spatial reuse. Still further, while the above examples assumed that the bandwidth parts utilized by the APs, at least partially, differ in the frequency domain, it would also be possible to apply the illustrated concepts to bandwidth parts which, at least partially, differ in the time domain, e.g., by utilizing a time-domain multiplexing multi-link mode.

Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

The invention claimed is:

1. A method of controlling wireless transmissions in a wireless communication system, the method comprising:
    an access point of the wireless communication system operating on a primary bandwidth part of a medium, said operating on the primary bandwidth part being based on carrier sensing to gain access to the primary bandwidth part of the medium;
    the access point scanning a secondary bandwidth part of the medium to detect control messages transmitted on the secondary bandwidth part, without performing carrier sensing to gain access to the secondary bandwidth part of the medium;
    the access point detecting a control message indicating that another access point reserved a transmission opportunity (TXOP) on the secondary bandwidth part of the medium; and
    in response to the control message, the access point cooperating with the other access point by sharing the TXOP for performing one or more transmissions of data.

2. The method according to claim 1, comprising:
    the access point receiving configuration information from the other access point, the configuration information indicating a bandwidth part of the medium on which the other access point is operating; and
    the access point selecting the secondary bandwidth part based on the received configuration information.

3. The method according to claim 2, wherein the access point receives at least a part of the configuration information:
    in a broadcast message transmitted by the other access point; or
    in a unicast handshake message exchange between the access point and the other access point; or
    in a multicast handshake message exchange in a group of access points which includes the access point and the other access point.

4. The method according to claim 1, comprising:
    the access point detecting one or more beacons transmitted by the other access point; and
    the access point selecting the secondary bandwidth part based on the detected one or more beacons.

5. The method according to claim 1, wherein the detected control message comprises an invitation to participate in sharing of the TXOP and/or indicates a bandwidth part for which the TXOP was obtained.

6. The method according to claim 1, wherein the detected control message is transmitted on the secondary bandwidth part or in the primary bandwidth part.

7. The method according to claim 1, wherein the detected control message is transmitted in the primary bandwidth part and on a channel commonly used by the access point and the other access point.

8. The method according to claim 1, comprising, while sharing the TXOP for performing the one or more transmissions of data, the access point maintaining synchronization with the primary bandwidth part.

9. The method according to claim 1, wherein the wireless communication system is based on a Wireless Local Area Network technology according to the IEEE 802.11 standards family.

10. A method of controlling wireless transmissions in a wireless communication system, the method comprising:

an access point of the wireless communication system operating on a bandwidth part of a medium, said operating on the bandwidth part being based on carrier sensing to gain access to the bandwidth part of the medium;

in response to gaining access to the bandwidth part of the medium, the access point reserving a transmission opportunity (TXOP) on the bandwidth part;

on another bandwidth part of the medium, the access point sending a control message for initiating sharing of the TXOP with one or more other access points operating the other bandwidth part; and in response to the control message, the access point cooperating with the one or more other access points by sharing the TXOP for performing one or more transmissions of data.

11. The method according to claim 10, comprising the access point sending configuration information to the one or more other access points, the configuration information indicating the bandwidth part of the medium on which the access point is operating.

12. The method according to claim 11, wherein the access point sends at least a part of the configuration information in a broadcast message transmitted to the one or more other access points.

13. The method according to claim 11, wherein, for each of the one or more other access points, the access point sends at least a part of the configuration information in a unicast handshake message exchange between the access point and the other access point and/or in a multicast handshake message exchange in a group of access points which includes the access point and the other access point.

14. The method according to claim 10, wherein the control message comprises an invitation to participate in sharing of the TXOP and/or indicates the bandwidth part for which the TXOP was obtained.

15. The method according to claim 10, wherein the control message is transmitted on a channel commonly used by the access point and the one or more other access points.

16. The method according to claim 10, wherein the wireless communication system is based on a Wireless Local Area Network technology according to the IEEE 802.11 standards family.

17. An access point for a wireless communication system, the access point comprising:

one or more radio interfaces;

one or more processors coupled to the one or more radio interfaces; and a memory coupled to the one or more processors and containing program code executable by the one or more processors whereby the access point is configured to:

operate on a primary bandwidth part of a medium based on carrier sensing to gain access to the primary bandwidth part of the medium;

scan a secondary bandwidth part of the medium to detect control messages transmitted on the secondary bandwidth part, without performing carrier sensing to gain access to the secondary bandwidth part of the medium;

detect a control message indicating that another access point reserved a transmission opportunity (TXOP) on the secondary bandwidth part of the medium; and in response to the control message, cooperate with the other access point by sharing the TXOP for performing one or more transmissions of data.

18. The access point according to claim 17, the memory containing program code executable by the one or more processors whereby the access point is further configured to:

receive configuration information from the other access point, the configuration information indicating a bandwidth part of the medium on which the other access point is operating; and select the secondary bandwidth part based on the received configuration information.

19. The access point according to claim 17, the memory containing program code executable by the one or more processors whereby the access point is configured to receive at least a part of the configuration information:

in a broadcast message transmitted by the other access point; or in a unicast handshake message exchange between the access point and the other access point; or in a multicast handshake message exchange in a group of access points which includes the access point and the other access point.

20. An access point for a wireless communication system, the access point comprising:

one or more radio interfaces;

one or more processors coupled to the one or more radio interfaces; and a memory coupled to the one or more processors and containing program code executable by the one or more processors whereby the access point is configured to:

operate on a bandwidth part of a medium, based on carrier sensing to gain access to the bandwidth part of the medium;

in response to gaining access to the bandwidth part of the medium, reserve a transmission opportunity (TXOP) on the bandwidth part;

on another bandwidth part of the medium, send a control message for initiating sharing of the TXOP with one or more other access points operating on the other bandwidth part; and in response to the control message, cooperate with the one or more other access points by sharing the TXOP for performing one or more transmissions of data.

* * * * *